US009082331B2

(12) United States Patent
Wang

(10) Patent No.: US 9,082,331 B2
(45) Date of Patent: Jul. 14, 2015

(54) LIQUID CRYSTAL DISPLAY PANEL AND ARRAY SUBSTRATE THEREOF

(75) Inventor: Zui Wang, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 375 days.

(21) Appl. No.: 13/522,325

(22) PCT Filed: Jun. 18, 2012

(86) PCT No.: PCT/CN2012/077057
§ 371 (c)(1),
(2), (4) Date: Jul. 15, 2012

(87) PCT Pub. No.: WO2013/185360
PCT Pub. Date: Dec. 19, 2013

(65) Prior Publication Data
US 2013/0335393 A1 Dec. 19, 2013

(51) Int. Cl.
H04N 13/04 (2006.01)
G09G 3/00 (2006.01)
G09G 3/36 (2006.01)

(52) U.S. Cl.
CPC ............ G09G 3/003 (2013.01); G09G 3/3648 (2013.01); H04N 13/0429 (2013.01); H04N 13/0452 (2013.01); G09G 2300/0447 (2013.01); G09G 2300/0842 (2013.01); G09G 2320/028 (2013.01); G09G 2320/0242 (2013.01); H04N 2213/001 (2013.01)

(58) Field of Classification Search
CPC ....... G09G 3/003; G09G 3/36; G09G 3/3648; G09G 2300/0443; G09G 3/3659; G09G 3/3696; G09G 2320/0686
USPC .................. 345/212, 419, 694, 92; 348/51–60
See application file for complete search history.

(56) References Cited

U.S. PATENT DOCUMENTS

| 2007/0211007 | A1* | 9/2007 | Su et al. .......................... 345/92 |
| 2010/0118058 | A1* | 5/2010 | Murai et al. ................... 345/690 |
| 2012/0013656 | A1* | 1/2012 | Chae ............................. 345/694 |
| 2012/0154467 | A1* | 6/2012 | Hwang et al. ................. 345/694 |
| 2012/0242723 | A1* | 9/2012 | Miyake .......................... 345/694 |
| 2012/0274748 | A1* | 11/2012 | Hwang et al. .................. 348/51 |

* cited by examiner

Primary Examiner — William Boddie
Assistant Examiner — Sahlu Okebato
(74) Attorney, Agent, or Firm — Andrew C. Cheng

(57) ABSTRACT

The present invention provides a liquid crystal display panel and array substrate thereof. The array substrate includes at least a plurality of first scan lines, second scan lines, data lines and a plurality of pixel units arranged in a matrix form; pixel electrodes of pixel unit being divided into at least first sub electrode, second sub electrode and third sub electrode, and controlling first sub electrode and second sub electrode to have a default voltage difference when displaying voltage signal of a same image in 3D display mode. As such, the present invention can reduce signal crosstalk problem in 3D display mode, improve color difference in large view angle condition and reduce color distortion.

15 Claims, 17 Drawing Sheets

LIQUID CRYSTAL DISPLAY PANEL AND ARRAY SUBSTRATE THEREOF

BACKGROUND OF THE INVENTION

1. Field of the Invention

The present invention relates to the field of liquid crystal displaying techniques, and in particular to a liquid crystal display panel and array substrate thereof.

2. The Related Arts

As the displaying technique continues to grow, the three dimensional (3D) displaying technique is also becoming more matured. A variety of 3D image equipments, such as, 3D TV, 3D projection, 3D camera, is becoming available in the market. Compared to a two dimensional (2D) displaying technique, the display of 3D displaying technique is more vivid and shows better visual effects. Three dimensional displaying is becoming a mainstream of the future display device.

Film-type patterned retarder (FPR) is one of the 3D liquid crystal imaging techniques. As shown in FIG. 1, FPR 3D display system includes a liquid crystal display panel 11, patterned retarder thin film 12 and patterned retarder eyeglasses 13. Liquid crystal display panel 11 includes pixel 16 forming left-eye signal, pixel 17 forming right-eye signal and black matrix (BM) 18 between pixel 16 and pixel 17. FPR 3D display system mainly uses patterned retarder thin film 12 attached to liquid crystal panel 11 to separate 3D image into left-eye image 14 and right-eye image 15. Then, through patterned retarder eyeglasses 13, left-eye image 14 and right-eye image 15 are sent to left eye and right eye of the user respectively. The left eye and right eye of the user receive the two sets of images and the brain synthesizes the two image sets into a 3D image.

Because FPR 3D displaying technique does not require opening and closing of a lens, FPR 3D display system shows less flickering in the display and achieves better visual experience; especially, when working with vertical alignment (VA) display panel to view 3D images, the result is even better. This is because VA display panel, compared to known display panel, has high contrast and short response time, and can provide better display result. However, VA panel is deficient in screen uniformity so that color drift often occurs. When viewed in large view angle, the color cast is easily detectable. Also, FPR 3D displaying technique also suffers the problem of view angle restriction, i.e., the viewer has a narrower view angle. When the viewer is at the position of larger view angle, the two eyes may suffer signal crosstalk, for example, the signal that should be sent to right eye is seen by the left eye, shown as the dash-line in FIG. 1. This situation leads to serious image crosstalk and results in poor image clarity. Therefore, when realizing FPR 3D displaying technique on VA display panel, the large view angle problem is severe.

In known techniques, the solution to solve the above view angle restriction problem of FPR 3D displaying technique is usually to increase the width of BM 18 between pixel 16 forming left-eye signal and pixel 17 forming right-eye signal in order to reduce possible signal crosstalk between two eyes, as shown in FIG. 1. The computation shows that the width of BM 18 must increase to ⅓ width of the pixel to be effective in reducing crosstalk. However, this approach will result in opening ratio of the pixel greatly reduced, and the luminance of liquid crystal display panel will also be reduced. In particular, when in 2D display mode, there is no crosstalk problem between two eyes, and yet luminance is still reduced. On the other hand, when 2D display panel is transformed into a panel able to display 2D and 3D images, the transformation can be realized by manufacturing a BM mask. After increasing width of BM 18, corresponding BM mask must also be modified and thus manufacture cost of liquid crystal display panel is increased.

Another approach is to use one gate line two data line (1G2D) pixel design. As shown in FIG. 2, a pixel structure using 1G2D pixel design includes a first data line 21, a second data line 22, a scan line 23, a main pixel 24 and a sub pixel 25. First data line 21 and second data line 22 supply signal to main pixel 24 and sub pixel 25. Main pixel 24 and sub pixel 25 are driven by same scan line 25. When liquid crystal display panel switches from 2D display mode to 3D display mode, black screen signal is inputted to main pixel 24 to display the color black to realize BM effect in main pixel area and to reduce signal crosstalk between two eyes. Main pixel 24 and sub pixel 25 of 1G2D pixel design have different liquid crystal rotation angles so that liquid crystal panel has good low color cast effect in 2D display mode. However, when switching to 3D display mode, because main pixel 24 is black, only liquid crystal rotation of sub pixel 25 is shown, and the low color cast effect is lost. In addition, VA display panel exists own color cast, the color anomaly observed by the viewer at position with large viewing angle is even more severe.

SUMMARY OF THE INVENTION

The technical issue to be addressed by the present invention is to provide a liquid crystal display panel and array substrate thereof, to allow liquid crystal display panel in 3D display mode to effectively improve color difference under large view angle, reduce color distortion and improve display result.

The present invention provides an array substrate for VA liquid crystal display panel, which comprises: at least a plurality of first scan lines, second scan lines, data lines and a plurality of pixel units arranged in a matrix form; each of the pixel units further comprising: switch element and pixel electrode, and each of the pixel units corresponding to at least a first scan line, a second scan line and a data line; pixel electrode at least comprising a first sub electrode, a second sub electrode and a third sub electrode; number of the switch element of each of pixel units being at least three, that is, a first switch element, a second switch element and a third switch element, respectively; output terminals of the first switch, the second switch and the third switch being electrically connected to the first sub electrode, the second sub electrode and the third sub electrode, respectively; input terminals of the first switch element and the second switch element being electrically connected to the data line or output end of the second switch element; control terminals of the first switch element and the second switch element being electrically connected to first scan line respectively, and control terminal of the third switch element being electrically connected to second scan line; wherein under condition of input terminal of the third switch element being electrically connected to data line, the second scan line inputting scan signal to control the third switch element to conduct when entering 3D display mode, the data line inputting a voltage signal corresponding to BM image through the third switch element to the third sub electrode, and then stopping inputting scan signal to the second scan line; after stopping inputting scan signal to the second scan line, the first scan line inputting scan signal to control the first switch element and the second switch element to conduct, the data line inputting voltage signal corresponding to a same image to be displayed through the first switch element and the second switch element respectively to the first sub electrode and the second sub electrode, and controlling a default voltage difference existing between the first sub electrode and the second sub electrode; when entering 2D display mode, the first scan line and the second scan line inputting scan signal respectively to control the first switch element, the second switch element and the third switch element to conduct, the data line inputting voltage signal corresponding to a same image to be displayed through the first switch element, the second switch element and the third switch element respectively to the first sub electrode, the second sub electrode and the third sub electrode, and controlling a default voltage difference existing between at least two sub electrodes of the first sub electrode, the second sub electrode and the third sub electrode.

According to a preferred embodiment of the present invention, the array substrate comprises at least a plurality of third scan lines, the data line comprises a first data line, each pixel unit corresponds to at least a third scan line and first data line; the switch elements of each pixel unit further comprise: a fourth switch element and a fifth switch element; the pixel unit further comprises a first coupling capacitor and a second coupling capacitor; output terminals of the fourth switch and the fifth switch are electrically connected to the first coupling capacitor and the second coupling capacitor, respectively; input terminals of the first switch element, the second switch element and the third switch element are electrically connected to the first data line, input terminals of the fourth switch element and the fifth switch element are electrically connected to the second sub electrode and the third sub electrode respectively, control terminals of the fourth switch element and the fifth switch element are electrically connected to the third scan line respectively; wherein a condition of when entering 3D display mode, the data line inputting a voltage signal corresponding to BM image through the third switch element to the third sub electrode means that the first data line inputs a voltage signal corresponding to BM image through the third switch element to the third sub electrode; condition of the data line inputs voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the first scan line; after stopping inputting scan signal to the first scan line, the third scan line inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

The present invention provides an array substrate for liquid crystal display panel, which comprises: at least a plurality of first scan lines, second scan lines, data lines and a plurality of pixel units arranged in a matrix form; each of the pixel units further comprising: switch element and pixel electrode, and each of the pixel units corresponding to at least a first scan line, a second scan line and a data line; pixel electrode at least comprising a first sub electrode, a second sub electrode and a third sub electrode; number of the switch element of each of pixel units being at least three, that is, a first switch element, a second switch element and a third switch element, respectively; output terminals of the first switch, the second switch and the third switch being electrically connected to the first sub electrode, the second sub electrode and the third sub electrode, respectively; input terminals of the first switch element, the second switch element and the third switch element being electrically connected to the data line; control terminals of the first switch element and the second switch element being electrically connected to first scan line respectively, and control terminal of the third switch element being electrically connected to second scan line; wherein the second scan line inputting scan signal to control the third switch element to conduct when entering 3D display mode, the data line inputting a voltage signal corresponding to BM image through the third switch element to the third sub electrode, and then stopping inputting scan signal to the second scan line; after stopping inputting scan signal to the second scan line, the first scan line inputting scan signal to control the first switch element and the second switch element to conduct, the data line inputting voltage signal corresponding to a same image to be displayed through the first switch element and the second switch element respectively to the first sub electrode and the second sub electrode, and controlling a default voltage difference existing between the first sub electrode and the second sub electrode.

According to a preferred embodiment of the present invention, when entering 2D display mode, the first scan line and the second scan line input scan signal respectively to control the first switch element, the second switch element and the third switch element to conduct, the data line inputs voltage signal corresponding to a same image to be displayed through the first switch element, the second switch element and the third switch element respectively to the first sub electrode, the second sub electrode and the third sub electrode, and controls a default voltage difference existing between at least two sub electrodes of the first sub electrode, the second sub electrode and the third sub electrode.

According to a preferred embodiment of the present invention, the array substrate comprises at least a plurality of third scan lines, the data line comprises a first data line, each pixel unit corresponds to at least a third scan line and first data line; the switch elements of each pixel unit further comprise: a fourth switch element and a fifth switch element; the pixel unit further comprises a first coupling capacitor and a second coupling capacitor; output terminals of the fourth switch and the fifth switch are electrically connected to the first coupling capacitor and the second coupling capacitor, respectively; input terminals of the first switch element, the second switch element and the third switch element are electrically connected to the first data line, input terminals of the fourth switch element and the fifth switch element are electrically connected to the second sub electrode and the third sub electrode respectively, control terminals of the fourth switch element and the fifth switch element are electrically connected to the third scan line respectively; wherein a condition of when entering 3D display mode, the data line inputting a voltage signal corresponding to BM image through the third switch element to the third sub electrode means that the first data line inputs a voltage signal corresponding to BM image through the third switch element to the third sub electrode; condition of the data line inputting voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the first scan line; after stopping inputting scan signal to the first scan line, the third scan line inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

According to a preferred embodiment of the present invention, the first switch element, the second switch element, the third switch element, the fourth switch element and the fifth switch element are a first thin film transistor, a second thin film transistor, a third thin film transistor, a fourth thin film transistor and a fifth thin film transistor respectively; the first thin film transistor comprises a first gate terminal, a first source terminal and a first drain terminal, the first source terminal is electrically connected to the first data line, the first drain terminal is electrically connected to the first sub electrode, and the first gate terminal is electrically connected to the first scan line to control the conduction and disconduction (i.e., on and off) of the first thin film transistor; the second thin film transistor comprises a second gate terminal, a second source terminal and a second drain terminal, the second source terminal is electrically connected to the first data line, the second drain terminal is electrically connected to the second sub electrode, and the second gate terminal is electrically connected to the first scan line to control the conduction and disconduction (i.e., on and off) of the second thin film transistor; the third thin film transistor comprises a third gate terminal, a third source terminal and a third drain terminal, the third source terminal is electrically connected to the first data line or the second drain terminal of the second thin film transistor, the third drain terminal is electrically connected to the third sub electrode, and the third gate terminal is electrically connected to the second scan line to control the conduction and disconduction (i.e., on and off) of the third thin film transistor; the fourth thin film transistor comprises a fourth gate terminal, a fourth source terminal and a fourth drain terminal, the fourth source terminal is electrically connected to the second sub electrode, the fourth drain terminal is electrically connected to the first coupling capacitor, and the fourth gate terminal is electrically connected to the third scan line to control the conduction and disconduction (i.e., on and off) of the fourth thin film transistor; the fifth thin film transistor comprises a fifth gate terminal, a fifth source terminal and a fifth drain terminal, the fifth source terminal is electrically connected to the third sub electrode, the fifth drain terminal is electrically connected to the second coupling capacitor, and the fifth gate terminal is electrically connected to the third scan line to control the conduction and disconduction (i.e., on and off) of the fifth thin film transistor.

According to a preferred embodiment of the present invention, when entering 2D display mode, under condition of the third source terminal electrically connected to the first data line, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the first data line inputting voltage signal corresponding to a same image to be displayed through the first thin film transistor, the second thin film transistor and the third thin film transistor to the first sub electrode, the second sub electrode and the third sub electrode respectively, and then stopping inputting scan signal to the first scan line and the second scan line; after stopping inputting scan signal to the first scan line and the second scan line, the third scan line inputting scan signal to control the fourth thin film transistor and the fifth thin film transistor to conduct, voltage signal of the second sub electrode passing though the fourth thin film transistor and coupled to the first coupling capacitor, voltage signal of the third sub electrode passing though the fifth thin film transistor and coupled to the second coupling capacitor, adjusting the first coupling capacitor and the second coupling capacitor so that the first sub electrode having a default voltage difference with the second sub electrode and the third electrode respectively, or default voltage difference existing among the first sub electrode, the second sub electrode and the third sub electrode; under condition of the third source terminal and the second drain terminal of the second thin film transistor electrically connected, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the first data line inputting voltage signal corresponding to a same image to be displayed through the first thin film transistor and the second thin film transistor to the first sub electrode and the second sub electrode respectively, voltage signal passing through the second thin film transistor and the third thin film transistor to the third sub electrode, and then stopping inputting scan signal to the first scan line and the second scan line; after stopping inputting scan signal to the first scan line and the second scan line, the third scan line inputting scan signal to control the fourth thin film transistor and the fifth thin film transistor to conduct, voltage signal of the second sub electrode passing though the fourth thin film transistor and coupled to the first coupling capacitor, voltage signal of the third sub electrode passing though the fifth thin film transistor and coupled to the second coupling capacitor, adjusting the first coupling capacitor and the second coupling capacitor so that the first sub electrode having a default voltage difference with the second sub electrode and the third electrode respectively, or default voltage difference existing among the first sub electrode, the second sub electrode and the third sub electrode.

According to a preferred embodiment of the present invention, the array substrate comprises at least a plurality of third scan lines, the data line comprises a first data line, each pixel unit corresponds to at least a third scan line and first data line; the switch elements of each pixel unit further comprise: a fourth switch element; the pixel unit further comprises a first coupling capacitor; output terminal of the fourth switch element is electrically connected to the first coupling capacitor; input terminals of the first switch element, the second switch element and the third switch element are electrically connected to the first data line, input terminal of the fourth switch element is electrically connected to the second sub electrode, control terminal of the fourth switch element is electrically connected to the third scan line; wherein a condition of when entering 3D display mode, the data line inputting a voltage signal corresponding to BM image through the third switch element to the third sub electrode means that the first data line inputs a voltage signal corresponding to BM image through the third switch element to the third sub electrode; condition of the data line inputting voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the first scan line; after stopping inputting scan signal to the first scan line, the third scan line inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

According to a preferred embodiment of the present invention, the first switch element, the second switch element, the third switch element and the fourth switch element are a first thin film transistor, a second thin film transistor, a third thin film transistor and a fourth thin film transistor respectively; the first thin film transistor comprises a first gate terminal, a first source terminal and a first drain terminal, the first source terminal is electrically connected to the first data line, the first drain terminal is electrically connected to the first sub electrode, and the first gate terminal is electrically connected to the first scan line to control the conduction and disconduction (i.e., on and off) of the first thin film transistor; the second thin film transistor comprises a second gate terminal, a second source terminal and a second drain terminal, the second source terminal is electrically connected to the first data line, the second drain terminal is electrically connected to the second sub electrode, and the second gate terminal is electrically connected to the first scan line to control the conduction and disconduction (i.e., on and off) of the second thin film transistor; the third thin film transistor comprises a third gate terminal, a third source terminal and a third drain terminal, the third source terminal is electrically connected to the first data line, the second drain terminal of the second thin film transistor or the first drain terminal of the first thin film transistor, the third drain terminal is electrically connected to the third sub electrode, and the third gate terminal is electrically connected to the second scan line to control the conduction and disconduction (i.e., on and off) of the third thin film transistor; the fourth thin film transistor comprises a fourth gate terminal, a fourth source terminal and a fourth drain terminal, the fourth source terminal is electrically connected to the second sub electrode, the fourth drain terminal is electrically connected to the first coupling capacitor, and the fourth gate terminal is electrically connected to the third scan line to control the conduction and disconduction (i.e., on and off) of the fourth thin film transistor.

According to a preferred embodiment of the present invention, when entering 2D display mode, under condition of the third source terminal electrically connected to the first data line, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the first data line inputting voltage signal corresponding to a same image to be displayed through the first thin film transistor, the second thin film transistor and the third thin film transistor to the first sub electrode, the second sub electrode and the third sub electrode respectively, and then stopping inputting scan signal to the first scan line and the second scan line; after stopping inputting scan signal to the first scan line and the second scan line, the third scan line inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively; under condition of the third source terminal and the second drain terminal of the second thin film transistor electrically connected, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the first data line inputting voltage signal corresponding to a same image to be displayed through the first thin film transistor and the second thin film transistor to the first sub electrode and the second sub electrode respectively, voltage signal passing through the second thin film transistor and the third thin film transistor to the third sub electrode, and then stopping inputting scan signal to the first scan line and the second scan line; after stopping inputting scan signal to the first scan line and the second scan line, the third scan line inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively; under condition of the third source terminal and the first drain terminal of the first thin film transistor electrically connected, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the first data line inputting voltage signal corresponding to a same image to be displayed through the first thin film transistor and the second thin film transistor to the first sub electrode and the second sub electrode respectively, voltage signal passing through the first thin film transistor and the third thin film transistor to the third sub electrode, and then stopping inputting scan signal to the first scan line and the second scan line; after stopping inputting scan signal to the first scan line and the second scan line, the third scan line inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively.

According to a preferred embodiment of the present invention, the data lines further comprises second data line and third data line; each pixel unit corresponds to at least a second data line and third data line; input terminal of the first switch element is electrically connected to the second data line, input terminals of the second switch element and the third switch element are electrically connected to the third data line respectively; wherein a condition of when entering 3D display mode, the data line inputting a voltage signal corresponding to BM image through the third switch element to the third sub electrode means that the third data line inputs a voltage signal corresponding to BM image through the third switch element to the third sub electrode; a condition of the data line inputting voltage signal corresponding to a same image to be displayed through the first switch element and the second switch element respectively to the first sub electrode and the second sub electrode, and controlling a default voltage difference existing between the first sub electrode and the second sub electrode means that the second data line and the third data line input voltage signal corresponding to a same image to be displayed through the first switch element and the second switch element respectively to the first sub electrode and the second sub electrode to make difference exist between inputted voltage signal from the second data line and the third data line so that a default voltage difference exists between the first sub electrode and the second sub electrode.

According to a preferred embodiment of the present invention, the first switch element, the second switch element and the third switch element are a first thin film transistor, a second thin film transistor and a third thin film transistor respectively; the first thin film transistor comprises a first gate terminal, a first source terminal and a first drain terminal, the first source terminal is electrically connected to the second data line, the first drain terminal is electrically connected to the first sub electrode, and the first gate terminal is electrically connected to the first scan line to control the conduction and disconduction (i.e., on and off) of the first thin film transistor; the second thin film transistor comprises a second gate terminal, a second source terminal and a second drain terminal, the second source terminal is electrically connected to the third data line, the second drain terminal is electrically connected to the second sub electrode, and the second gate terminal is electrically connected to the first scan line to control the conduction and disconduction (i.e., on and off) of the second thin film transistor; the third thin film transistor comprises a third gate terminal, a third source terminal and a third drain terminal, the third source terminal is electrically connected to the third data line, the second drain terminal of the second thin film transistor or the first drain terminal of the first thin film transistor, the third drain terminal is electrically connected to the third sub electrode; and the third gate terminal is electrically connected to the second scan line to control the conduction and disconduction (i.e., on and off) of the third thin film transistor.

According to a preferred embodiment of the present invention, when entering 2D display mode, under condition of the third source terminal electrically connected to the third data line, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the second data line inputting a first voltage signal corresponding to a same image to be displayed through the first thin film transistor to the first sub electrode, the third data line inputting a second voltage signal corresponding to a same image to be displayed through the second thin film transistor and the third thin film transistor to the second sub electrode and the third sub electrode respectively, so that a difference existing between the first voltage signal and the second voltage signal to make a default voltage difference existing between the first sub pixel and the second sub electrode and between the first sub electrode and the third sub electrode respectively; under condition of the third source terminal and the second drain terminal of the second thin film transistor electrically connected, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the second data line inputting a first voltage signal corresponding to a same image to be displayed through the first thin film transistor to the first sub electrode, the third data line inputting a second voltage signal corresponding to a same image to be displayed through the second thin film transistor to the second sub electrode, the second voltage signal passing through the second thin film transistor and the third thin film transistor to the third sub electrode, so that a difference existing between the first voltage signal and the second voltage signal to make a default voltage difference existing between the first sub pixel and the second sub electrode and between the first sub electrode and the third sub electrode respectively; under condition of the third source terminal and the first drain terminal of the first thin film transistor electrically connected, the data line inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that the second data line inputting a first voltage signal corresponding to a same image to be displayed through the first thin film transistor to the first sub electrode, the first voltage signal passing through the first thin film transistor and the third thin film transistor to the third sub electrode, the third data line inputting a second voltage signal corresponding to a same image to be displayed through the second thin film transistor to the second sub electrode, so that a difference existing between the first voltage signal and the second voltage signal to make a default voltage difference existing between the first sub pixel and the second sub electrode and between the first sub electrode and the third sub electrode respectively.

The present invention provides a liquid crystal display panel, which comprises: an array substrate, the array substrate further comprises: at least a plurality of first scan lines, second scan lines, data lines and a plurality of pixel units arranged in a matrix form; each of the pixel units further comprising: switch element and pixel electrode, and each of the pixel units corresponding to at least a first scan line, a second scan line and a data line; pixel electrode at least comprising a first sub electrode, a second sub electrode and a third sub electrode; number of the switch element of each of pixel units being at least three, that is, a first switch element, a second switch element and a third switch element, respectively; output terminals of the first switch, the second switch and the third switch being electrically connected to the first sub electrode, the second sub electrode and the third sub electrode, respectively; input terminals of the first switch element, the second switch element and the third switch element being electrically connected to the data line respectively; control terminals of the first switch element and the second switch element being electrically connected to first scan line respectively, and control terminal of the third switch element being electrically connected to second scan line; wherein the second scan line inputting scan signal to control the third switch element to conduct when entering 3D display mode, the data line inputting a voltage signal corresponding to BM image through the third switch element to the third sub electrode, and then stopping inputting scan signal to the second scan line; after stopping inputting scan signal to the second scan line, the first scan line inputting scan signal to control the first switch element and the second switch element to conduct, the data line inputting voltage signal corresponding to a same image to be displayed through the first switch element and the second switch element respectively to the first sub electrode and the second sub electrode, and controlling a default voltage difference existing between the first sub electrode and the second sub electrode.

According to a preferred embodiment of the present invention, the liquid crystal display panel is a VA liquid crystal display panel; when entering 2D display mode, the first scan line and the second scan line input scan signal respectively to control the first switch element, the second switch element and the third switch element to conduct, and the data line inputs a voltage signal corresponding to a same image to be displayed through the first switch element, the second switch element and the third switch element respectively to the first sub electrode, the second sub electrode and the third sub electrode, and controlling a default voltage difference to exist between at least two sub electrodes selected from the first sub electrode, the second sub electrode and the third sub electrode.

The efficacy of the present invention is that to be distinguished from the state of the art. The present invention divides the pixel electrode of pixel unit into at least a first sub electrode, a second sub electrode and a third sub electrode, realizes the effect of a BM at the third sub electrode and make a default voltage difference existing between the first sub electrode and the second sub electrode when displaying voltage signal of a same image so as to solve the signal crosstalk problem in 3D display mode to achieve objectives of improving the color difference in large view angle situation, reducing color distortion and improving display result.

In addition, by supplying voltage signal of a same image to be displayed to the first sub electrode, the second sub electrode and the third sub electrode, and controlling a default voltage difference existing between at least two sub electrodes selected from the first sub electrode, the second sub electrode and the third sub electrode, the luminance of liquid crystal display panel in 2D display mode and opening ratio of the pixel are improved, the color difference in large view angle situation is improved, color distortion is reduced and display result is improved.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The structure of an array substrate of liquid crystal display panel of the present invention improves the color difference in large view angle situation in both 2D and 3D display modes, reduces color distortion and improves display result.

The following description refers to drawings and embodiments of the present invention.

Figure 1:
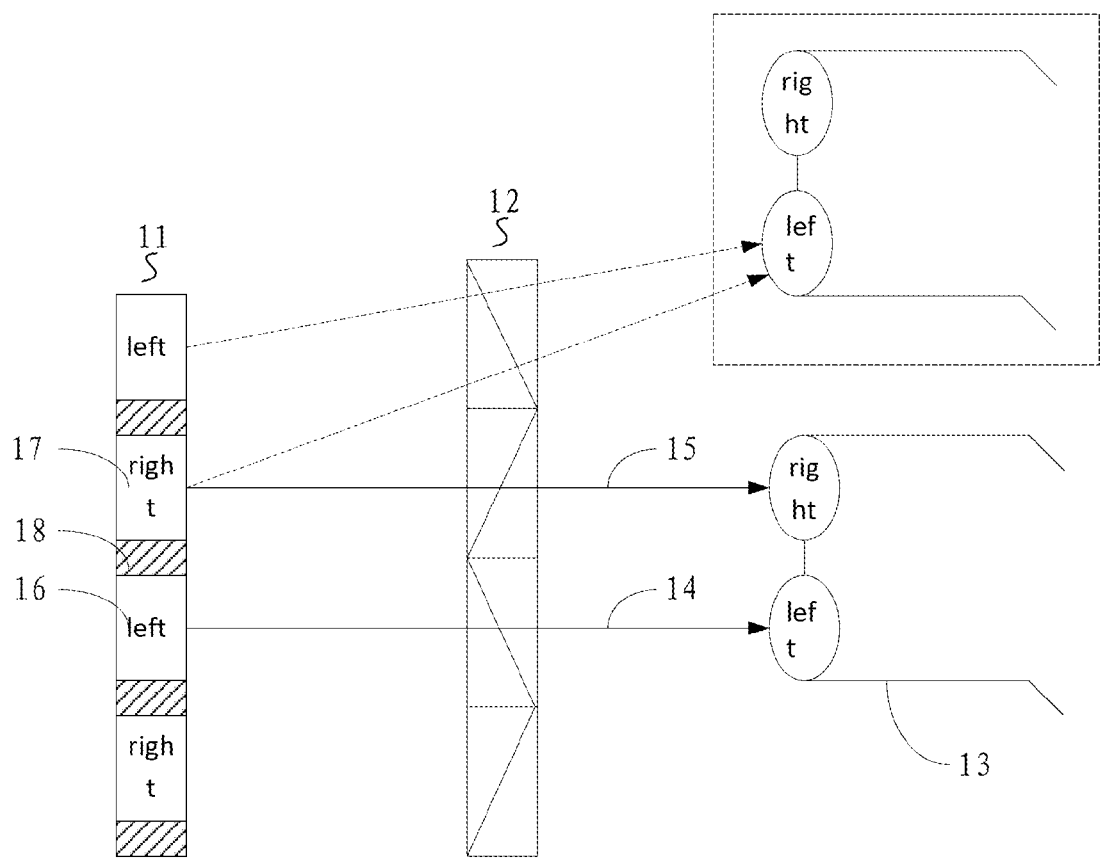
FIG. 1 is a schematic view showing the structure of a known FPR 3D display system, with difference between two optical paths at two different view angles.
Figure 2:
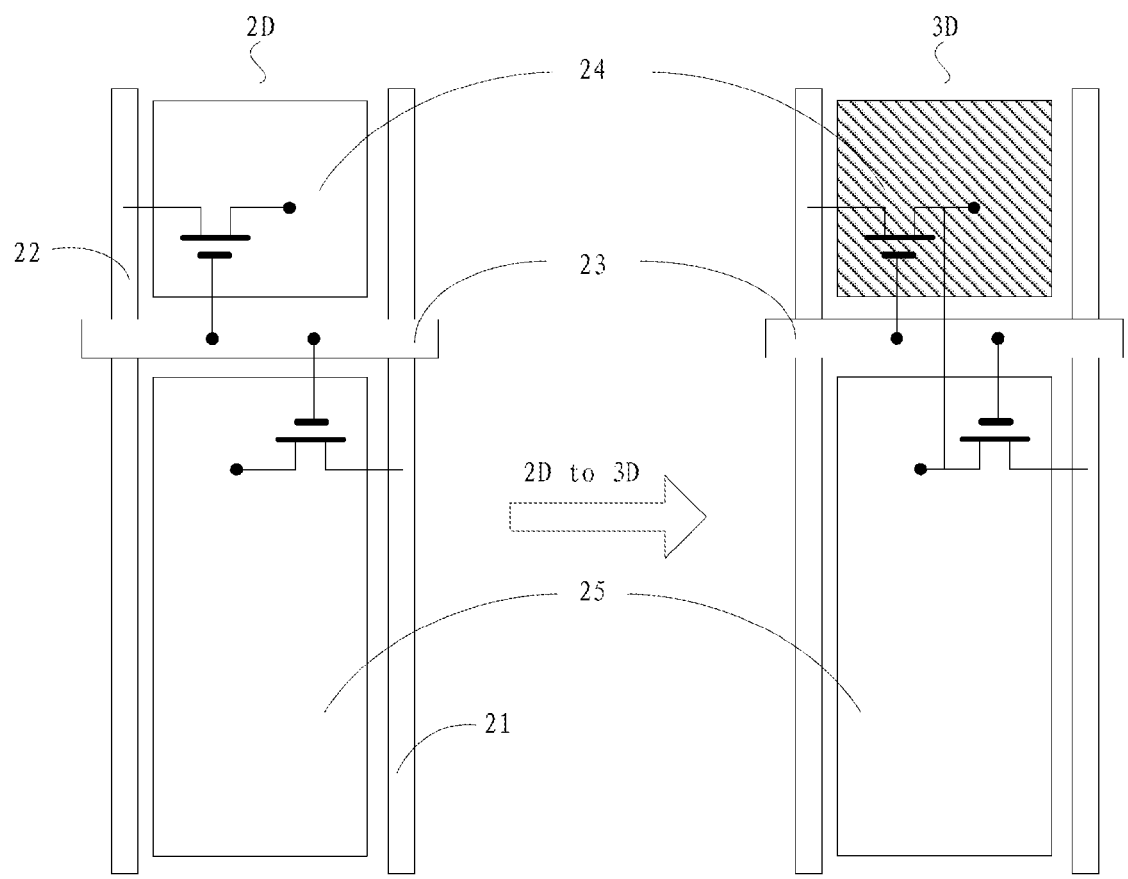
FIG. 2 is a schematic view showing the structure of a pixel using a known 1G2D pixel design, simultaneously showing the display states of main pixel and sub pixels in 2D and 3D display modes.
Figure 3:
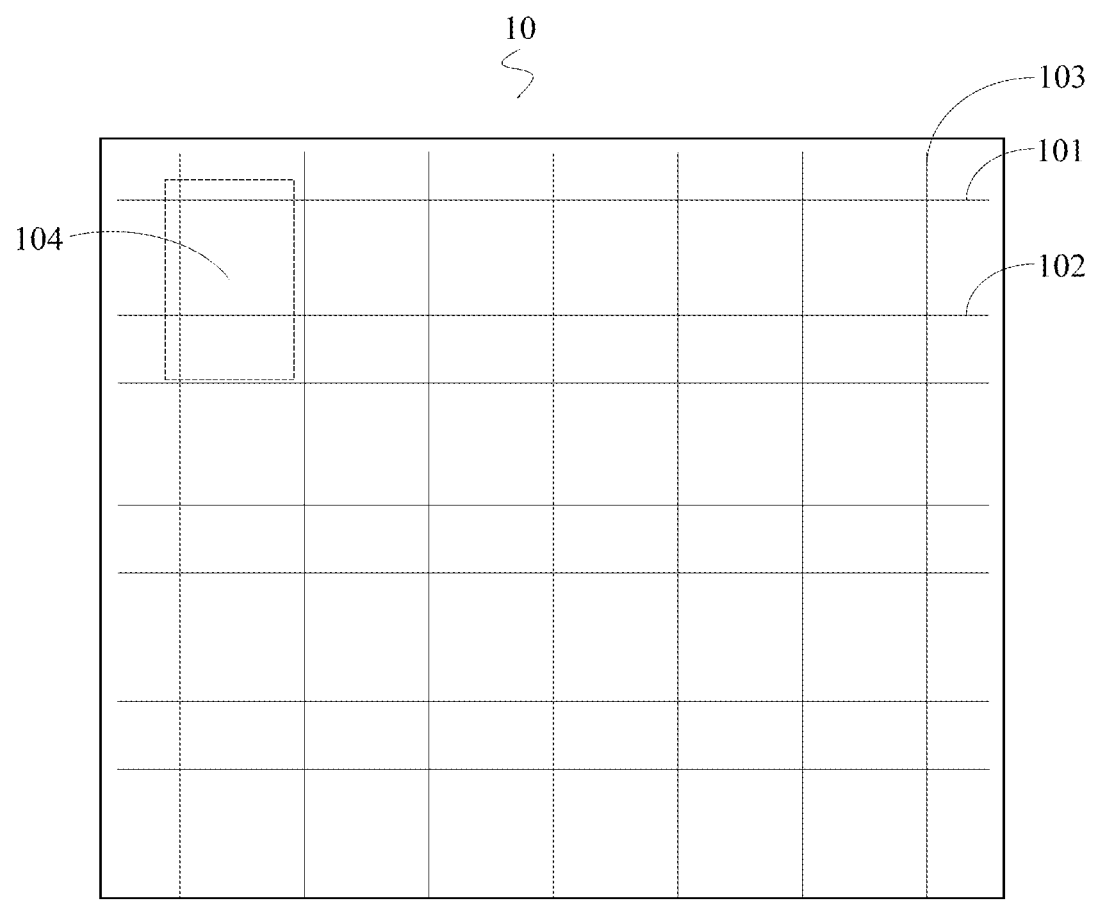
FIG. 3 is a schematic view showing the structure of an embodiment of the array substrate of the liquid crystal display panel of the present invention.
Figure 4:
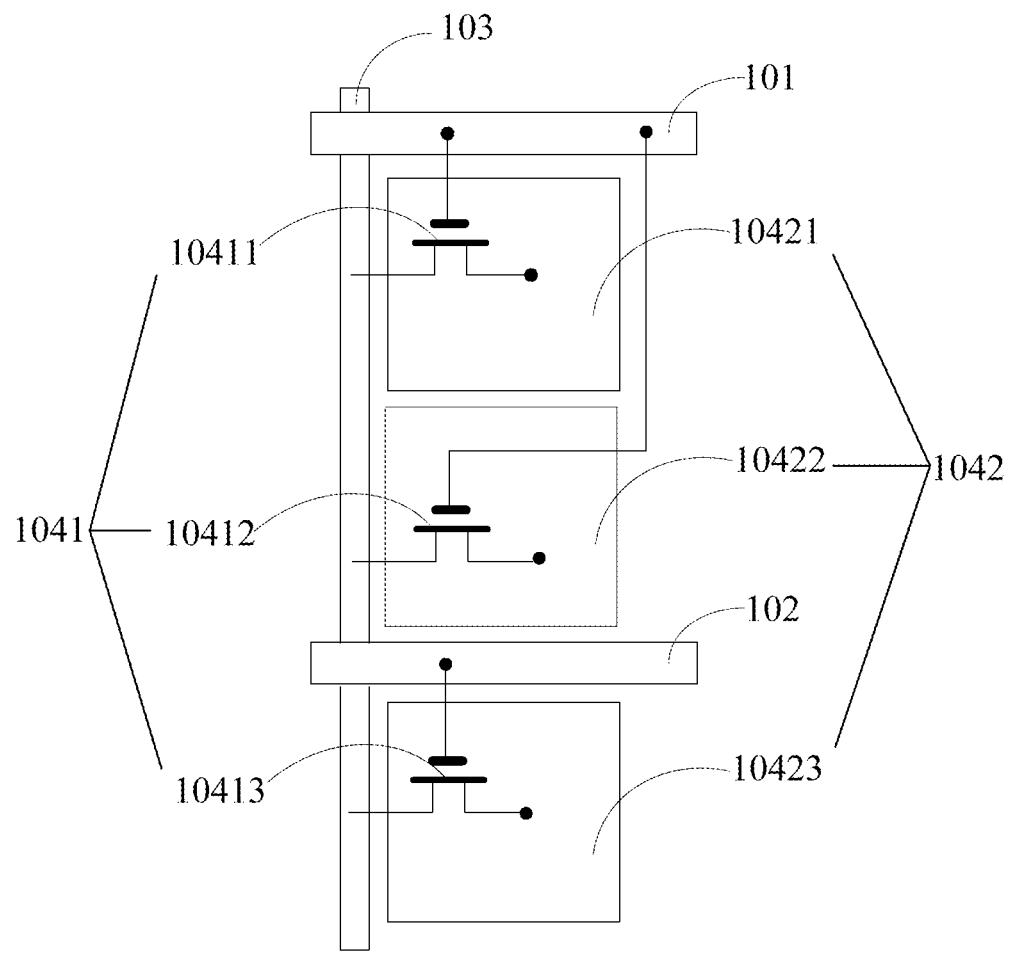
FIG. 4 is a schematic view showing the structure of an embodiment of a pixel unit of the dash-line box of the array substrate of FIG. 3.

Referring to FIG. 3 and FIG. 4. An embodiment of array substrate 10 of liquid crystal display panel of the present invention comprises at least a plurality of first scan lines 101, second scan line 102, data lines 103 and a plurality of pixel units 104 arranged in a matrix form. In the instant embodiment, each of the pixel units 104 further comprises: switch element 1041 and pixel electrode 1042, and each of the pixel units 104 corresponds to at least a first scan line 101, a second scan line 102 and a data line 103.

Pixel electrode 1042 at least comprises a first sub electrode 10421, a second sub electrode 10422 and a third sub electrode 10423. Number of switch element 1041 of each of pixel units 104 is at least three, that is, a first switch element 10411, a second switch element 10412 and a third switch element 10413, respectively.

Each of first switch element 10411, second switch element 10412 and third switch element 10413 comprises an input terminal, and output terminal and a control terminal. Output terminals of first switch 10411, second switch 10412 and third switch 10413 are electrically connected to first sub electrode 10421, second sub electrode 10422 and third sub electrode 10423, respectively. Input terminals of first switch 10411, second switch 10412 and third switch 10413 are electrically connected to data line 103. Control terminals of first switch 10411 and second switch 10412 are electrically connected to first scan line 101 respectively, and control terminal of third switch element 10413 is electrically connected to second scan line 102.

First switch 10411 and second switch 10412 are to control display and disconduction of first sub electrode 10421 and second sub electrode 10422, with control terminals connected to first scan line 101. When a scan signal is inputted to first scan line 101, first switch element 10411 and second 10412 are conductive simultaneously and data line 103 inputs voltage signal through first switch element 10411 and second switch element 10412 to first sub electrode 10421 and second sub electrode 10422 so that first sub electrode 10421 and second sub electrode 10422 simultaneously display. Third switch 10413 is to control display and disconduction of third sub electrode 10423, with control terminals connected to second scan line 102. When a scan signal is inputted to second scan line 102, third switch element 10413 is conductive and data line 103 inputs voltage signal through third switch element 10413 to third sub electrode 10423 so that third sub electrode 10423 displays.

Array substrate 10 of the instant embodiment realizes the switching between 2D and 3D displays of the liquid crystal display panel.

Figure 5:
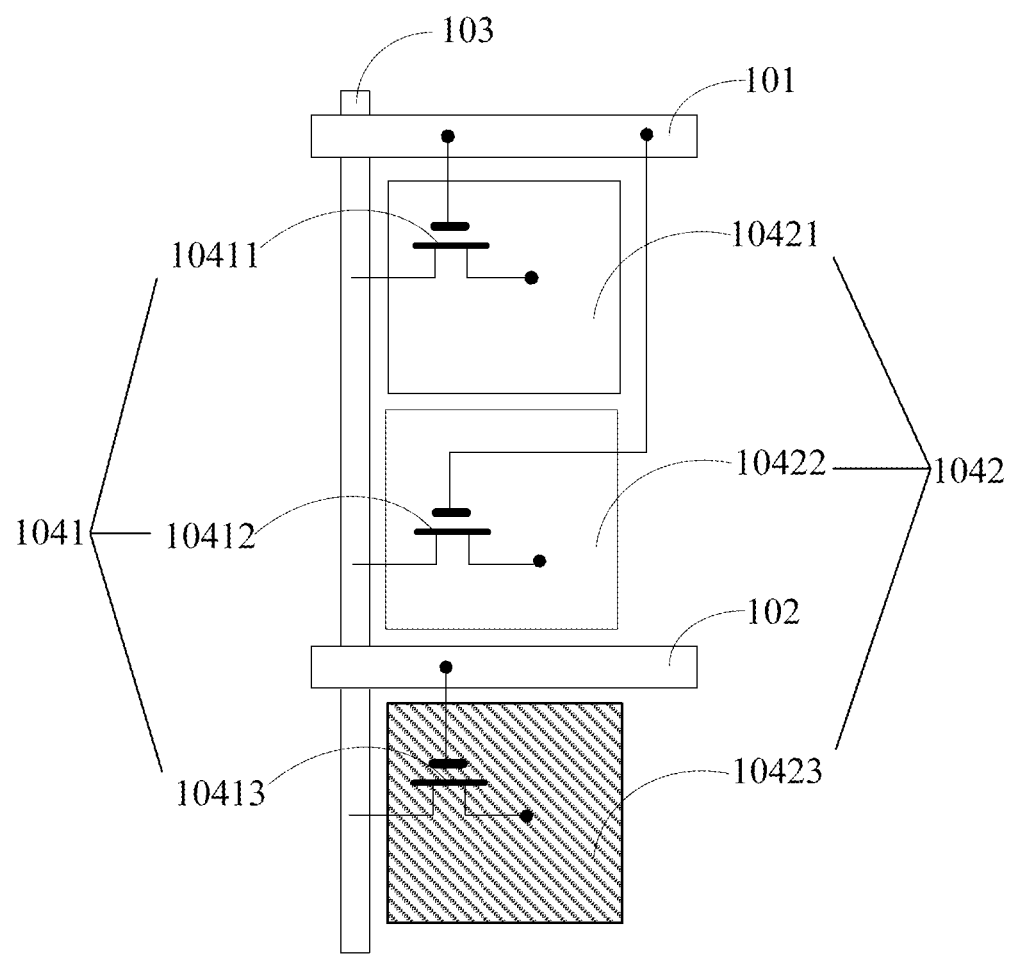
FIG. 5 is a schematic view showing the effect of the third sub electrode showing black image when the pixel unit of FIG. 4 entering 3D display mode.

When entering 3D display mode, a scan signal is inputted to second scan line 102 to control third switch element 10413 to conduct, data line 103 inputs a voltage signal corresponding to BM image through third switch element 10413 to third sub electrode 10423, and then stops inputting scan signal to second scan line 102. In this embodiment, the inputting of black image voltage signal to third sub electrode 10423 can perform "clearing screen" to third sub electrode 10423 so that third sub electrode 10423 displays a black image and then second scan line 102 is shut down, no longer supplies scan signal to third sub electrode 10423 to make third sub electrode 10423 maintain the black image, as shown in FIG. 5. After stopping inputting scan signal to second scan line 102, first scan line 101 inputs scan signal to control first switch element 10411 and second switch element 10412 to conduct, data line 103 inputs a voltage signal corresponding to a same image to be displayed through first switch element 10411 and second switch element 10412 respectively to first sub electrode 10421 and second sub electrode 10422, and controls a default voltage difference to exist between first sub electrode 10421 and second sub electrode 10422.

When entering 3D display mode, the liquid crystal display panel can perform "clearing screen" on pixel units 104. Specifically, input signals are inputted to first scan line 101 and second scan line 102 simultaneously to make first switch element 10411, second switch element 10412 and third switch element 10413 conductive. Data line 103 inputs a voltage signal corresponding to BM image through first switch element 10411, second switch element 10412 and third switch element 10413 to first sub electrode 10421, second sub electrode 10422 and third sub electrode 10423 to perform "clearing screen" to the entire pixel unit 104 so that pixel unit 104 displays a black image. Then, second scan line 102 is shut down, no longer supplies scan signal to third sub electrode 10423 to make third sub electrode 10423 maintain the black image, while continuing to supply scan signal to first scan line 101 so that first scan line 101 can input scan signal to control first switch element 10411 and second switch element 10412 to conduct, data line 103 inputs a voltage signal corresponding to a same image to be displayed through first switch element 10411 and second switch element 10412 respectively to first sub electrode 10421 and second sub electrode 10422, and controls a default voltage difference to exist between first sub electrode 10421 and second sub electrode 10422. Specific value of the default voltage difference depends on requirements. The requirements are to guarantee display quality, improve the color difference in large view angle situation, reduce color distortion and improve display result. The present invention does not provide any limitation on the specific value.

As such, when liquid crystal display panel enters 3D display mode, third sub electrode 10423 maintains a black image, equivalent to BM, so as to reduce possibility of signal crosstalk between two eyes in 3D display mode. In addition, the controlling of default voltage difference to exist between first sub electrode 10421 and second sub electrode 10422 can further control polarization of liquid crystal molecules so as to improve the color difference in large view angle situation, reduce color distortion and improve 3D display result.

Figure 6:
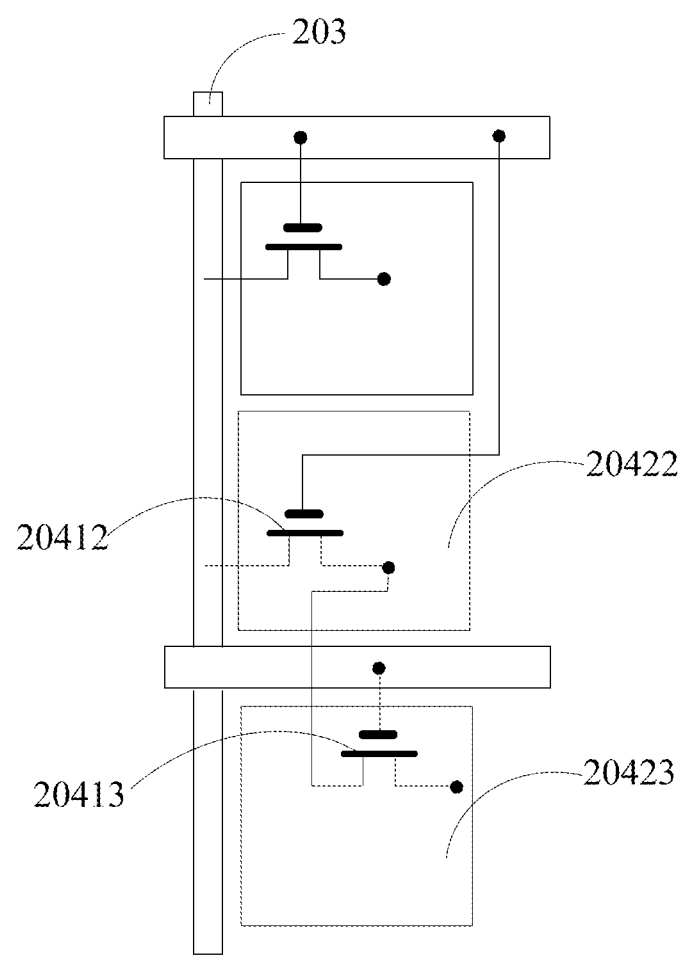
FIG. 6 is a schematic view showing the structure of another embodiment of a pixel unit of the dash-line box of the array substrate of FIG. 3.

It should be noted that, referring to FIG. 6, the input terminal of third switch element 20413 can be electrically connected to the output terminal of second switch element 20412. Data line 203 inputs voltage signal through second switch element 20412 to second sub electrode 20422. The voltage signal passes through second switch element 20412 and third switch element 20413 to third sub electrode 20423.

Besides the variation of electrically connecting the input terminal of third switch element 20413 to the output terminal of second switch element 20412, FIG. 6 is similar to FIG. 4 in corresponding structure and elements, and the description will not be repeated here.

Refer to FIG. 4. When liquid crystal display panel enters 2D display mode, first scan line 101 and second scan line 102 input scan signal respectively to control first switch element 10411, second switch element 10412 and third switch element 10413 to conduct, and data line 103 inputs a voltage signal corresponding to a same image to be displayed through first switch element 10411, second switch element 10412 and third switch element 10413 respectively to first sub electrode 10421, second sub electrode 10422 and third sub electrode 20423, and controlling a default voltage difference to exist between at least two sub electrodes of t first sub electrode 10421, second sub electrode 10422 and third sub electrode 20423.

When liquid crystal display panel enters 2D display mode, first scan line 101 and second scan line 102 are both conductive, and all three sub electrodes 10421, 10422, 10423 input a voltage signal corresponding to a same image to be displayed. As such, pixel unit 104 can have a bigger opening ratio to increase luminance of liquid crystal display panel. In addition, the controlling of default voltage difference to exist between two sub electrodes of three sub electrodes 10421, 10422, 10423 can further control polarization of liquid crystal molecules so as to improve the color difference in large view angle situation, reduce color distortion.

The present invention further provides a plurality of pixel unit designs for controlling a default voltage difference to exist between at least two sub electrodes of three sub electrodes.

Figure 7:
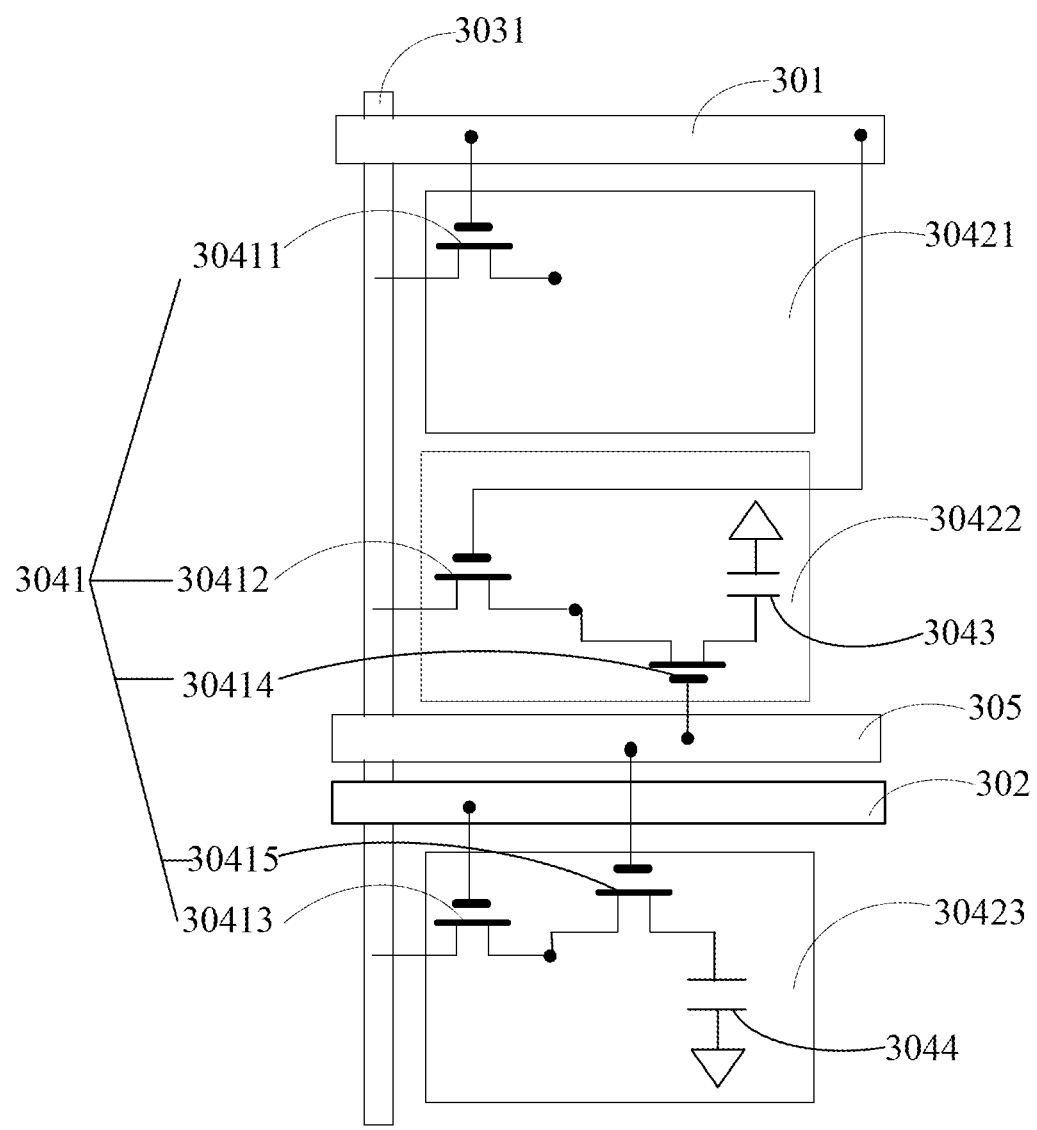
FIG. 7 is a schematic view showing the structure of an embodiment of a default voltage difference existing between at least two sub electrodes of the three sub electrodes of the pixel unit of the present invention.

Refer to FIG. 7 and FIG. 3. Array substrate 10 comprises at least a plurality of third scan lines 305, and data line 103 comprises a first data line 3031. Each pixel unit 104 corresponds to at least a third scan line 305 and first data line 3031. Switch elements 3041 of each pixel unit 104 further comprise a fourth switch element 30414 and a fifth switch element 30415. Pixel unit 104 further comprises a first coupling capacitor 3043 and a second coupling capacitor 3044.

Output terminals of fourth switch 30414 and fifth switch 30415 are electrically connected to first coupling capacitor 3043 and second coupling capacitor 3044, respectively. Input terminals of first switch element 30411, second switch element 30412 and third switch element 30413 are electrically connected to first data line 3031. Input terminals of fourth switch element 30414 and fifth switch element 30415 are electrically connected to second sub electrode 30422 and third sub electrode 30423 respectively. Control terminals of fourth switch element 30414 and fifth switch element 30415 are electrically connected to third scan line 305 respectively.

When the liquid crystal display panel enters 3D display mode, second scan line 302 inputs scan signal to make third switch element 30413 conductive, first data line 3031 inputs a voltage signal corresponding to BM image through third switch element 30413 to third sub electrode 30423. Then, second scan line 302 stops inputting scan signal to keep third sub electrode 30423 to maintain black image. First scan line 301 inputs a control signal to make first switch element 30411 and second switch element 30412 conductive, first data line 3031 inputs voltage signal corresponding to a same image to be displayed through first switch element 30411 and second switch element 30412 respectively to first sub electrode 30421 and second sub electrode 30422 to make liquid crystal display panel display image. At this point, first sub electrode 30421 and second sub electrode 30422 have a same voltage. Then, first scan line 301 stop inputting scan signal. After stopping inputting scan signal to first scan line 301, third scan line 305 inputs scan signal to make fourth switch element 30414 conductive. After fourth switch element 30414 becomes conductive, voltage signal on second sub electrode 30422 passes fourth switch element 304141 and is coupled to first coupling capacitor 3043 so that voltage on second sub electrode 30422 changes while voltage on first sub electrode 30421 does not change. Depending on actual requirement of color polarization of view angle, capacitance of first coupling capacitor 3043 is adjusted so that a default voltage difference exists between first sub electrode 30421 and second sub electrode 30422.

Figure 8:
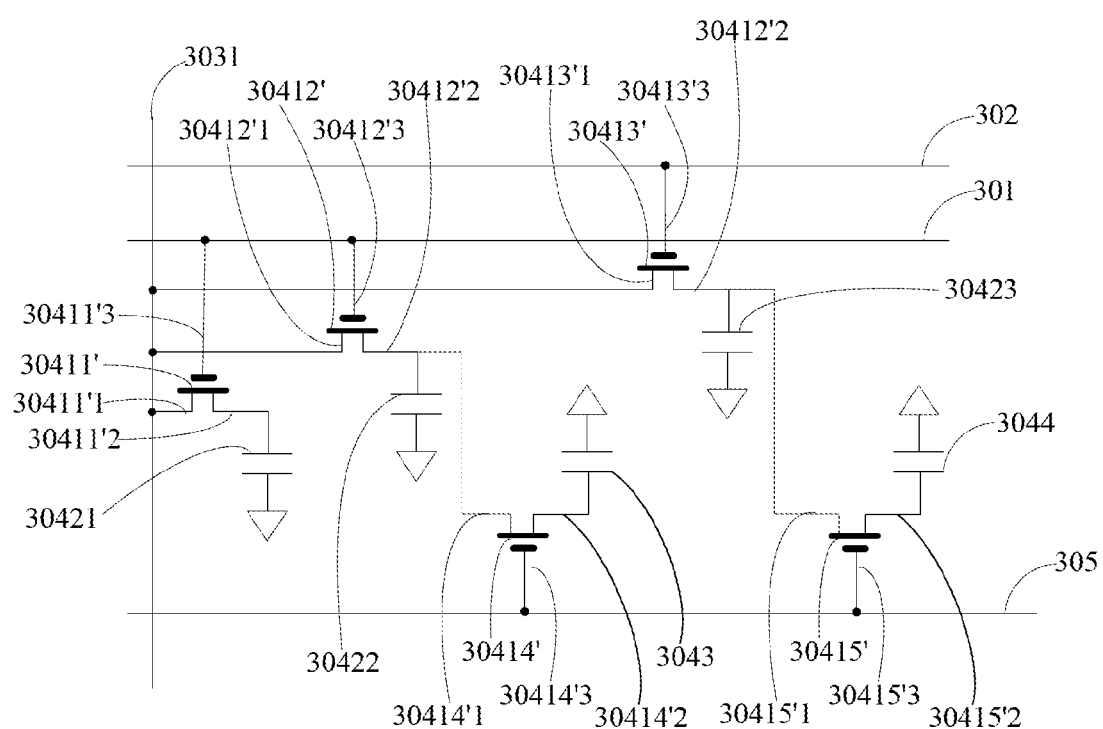
FIG. 8 is an equivalent circuit diagram of the switch element shown in FIG. 7 being a thin film transistor.

In the present embodiment, switch element 3041 is a three-terminal control switch. As shown in FIG. 8, take thin film transistor as example. First switch element 30411, second switch element 30412, third switch element 30413, fourth switch element 30414 and fifth switch element 30415 are first thin film transistor 30411', second thin film transistor 30412', third thin film transistor 30413', fourth thin film transistor 30414' and fifth thin film transistor 30415', respectively.

In the instant embodiment, first thin film transistor 30411' comprises a first gate terminal 30411' 3, a first source terminal 30411' 1 and a first drain terminal 30411' 2. First gate terminal 30411' 3, first source terminal 30411' 1 and first drain terminal 30411' 2 are used as control terminal, input terminal and output terminal of first thin film transistor 30411' respectively. First source terminal 30411' 1 is electrically connected to first data line 3031. First drain terminal 30411' 2 is electrically connected to first sub electrode 30421. First gate terminal 30411' 3 is electrically connected to first scan line 301 to control conduction and disconduction of first thin film transistor 30411'.

Second thin film transistor 30412' comprises a second gate terminal 30412' 3, a second source terminal 30412' 1 and a second drain terminal 30412' 2. Second gate terminal 30412' 3, second source terminal 30412' 1 and second drain terminal 30412' 2 are used as control terminal, input terminal and output terminal of second thin film transistor 30412' respectively. Second source terminal 30412' 1 is electrically connected to first data line 3031. Second drain terminal 30412' 2 is electrically connected to second sub electrode 30422. Second gate terminal 30411' 3 is electrically connected to first scan line 301 to control conduction and disconduction of second thin film transistor 30412'.

Third thin film transistor 30413' comprises a third gate terminal 30413' 3, a third source terminal 30413' 1 and a third drain terminal 30412' 2. Third gate terminal 30413' 3, third source terminal 30413' 1 and third drain terminal 30413' 2 are used as control terminal, input terminal and output terminal of third thin film transistor 30413' respectively. Third source terminal 30413' 1 is electrically connected to first data line 3031. Third drain terminal 30413' 2 is electrically connected to third sub electrode 30423. Third gate terminal 30413' 3 is electrically connected to second scan line 302 to control conduction and disconduction of third thin film 30413'.

Fourth thin film transistor 30414' comprises a fourth gate terminal 30414' 3, a fourth source terminal 30414' 1 and a fourth drain terminal 30414' 2. Fourth gate terminal 30414' 3, fourth source terminal 30414' 1 and fourth drain terminal 30414' 2 are used as control terminal, input terminal and output terminal of fourth thin film transistor 30414' respectively. Fourth source terminal 30414' 1 is electrically connected to second sub electrode 30422. Fourth drain terminal 30414' 2 is electrically connected to first coupling capacitor 3043. Fourth gate terminal 30414' 3 is electrically connected to third scan line 305 to control conduction and disconduction of fourth thin film 30414'.

Fifth thin film transistor 30415' comprises a fifth gate terminal 30415' 3, a fifth source terminal 30415' 1 and a fifth drain terminal 30415' 2. Fifth gate terminal 30415' 3, fifth source terminal 30415' 1 and fifth drain terminal 30415' 2 are used as control terminal, input terminal and output terminal of fifth thin film transistor 30415' respectively. Fifth source terminal 30415' 1 is electrically connected to third sub electrode 30423. Fifth drain terminal 30415' 2 is electrically connected to second coupling capacitor 3044. Fifth gate terminal 30415' 3 is electrically connected to third scan line 305 to control conduction and disconduction of fifth thin film 30415'.

When the liquid crystal display panel enters 2D display mode, first scan line 301 and second scan line 302 respectively input scan signal to make first thin film transistor 30411', second thin film transistor 30412' and third thin film transistor 30413' conductive. First data line 3031 inputs a voltage signal required to display a same image through first thin film transistor 30411', second thin film transistor 30412' and third thin film transistor 30413' to first sub electrode 30421, second sub electrode 30422 and third sub electrode 30423 to make the liquid crystal display panel to display the image. At this point, first sub electrode 30421, second sub electrode 30422 and third sub electrode 30423 have a same voltage level. Then, first scan line 301 and second scan line 302 stop inputting scan signal. After first scan line 301 and second scan line 302 stop inputting scan signal, third scan line 305 inputs scan signal to make fourth thin film transistor 30414' and fifth thin film transistor 30415' conductive.

Because of existence of first coupling capacitor 3043 and second coupling capacitor 3044, after fourth thin film transistor 30414' and fifth thin film transistor 30415' become conductive, voltage signal on second sub electrode 30422 passes fourth thin film transistor 30414' to be coupled to first coupling capacitor 3043, and voltage signal on third sub electrode 30423 passes fifth thin film transistor 30415' to be coupled to second coupling capacitor 3044. As such, voltage levels on second sub electrode 30422 and third sub electrode 30423 are changed. Depending on actual requirement of color polarization of view angle, capacitances of first coupling capacitor 3043 and second coupling capacitor 3044 are adjusted so that voltage levels on second sub electrode 30422 and third sub electrode 30423 can change accordingly. In other words, capacitances of first coupling capacitor 3043 and second coupling capacitor 3044 are adjusted so that a default voltage difference exists between first sub electrode 30411 and second sub electrode 30422, between first sub electrode 30411 and third sub electrode 30423 respectively; or, a default voltage difference exists between any two of first sub electrode 30411, second sub electrode 30422 and third sub electrode 30423 respectively.

As such, through respective electrical connection of second sub electrode 30422 and third sub electrode 30423 to additional first coupling capacitor 3043 and second coupling capacitor 3044, and changing capacitances of first coupling capacitor 3043 and second coupling capacitor 3044, a default voltage difference exists between first sub electrode 30411 and second sub electrode 30422, between first sub electrode 30411 and third sub electrode 30423 respectively; alternatively, a default voltage difference exists between any two of first sub electrode 30421, second sub electrode 30422 and third sub electrode 30423 respectively so as to control polarization of liquid crystal molecules to improve the color difference in large view angle situation in 2D display mode, reduce color distortion and improve display result. Also, in 3D display mode, a default voltage difference exists between first sub electrode 30421, second sub electrode 30422, and third sub electrode 30423 is controlled by second scan line 302 alone to realize BM effect to solve the signal crosstalk problem to improve the color difference in large view angle situation and reduce color distortion.

Figure 9:
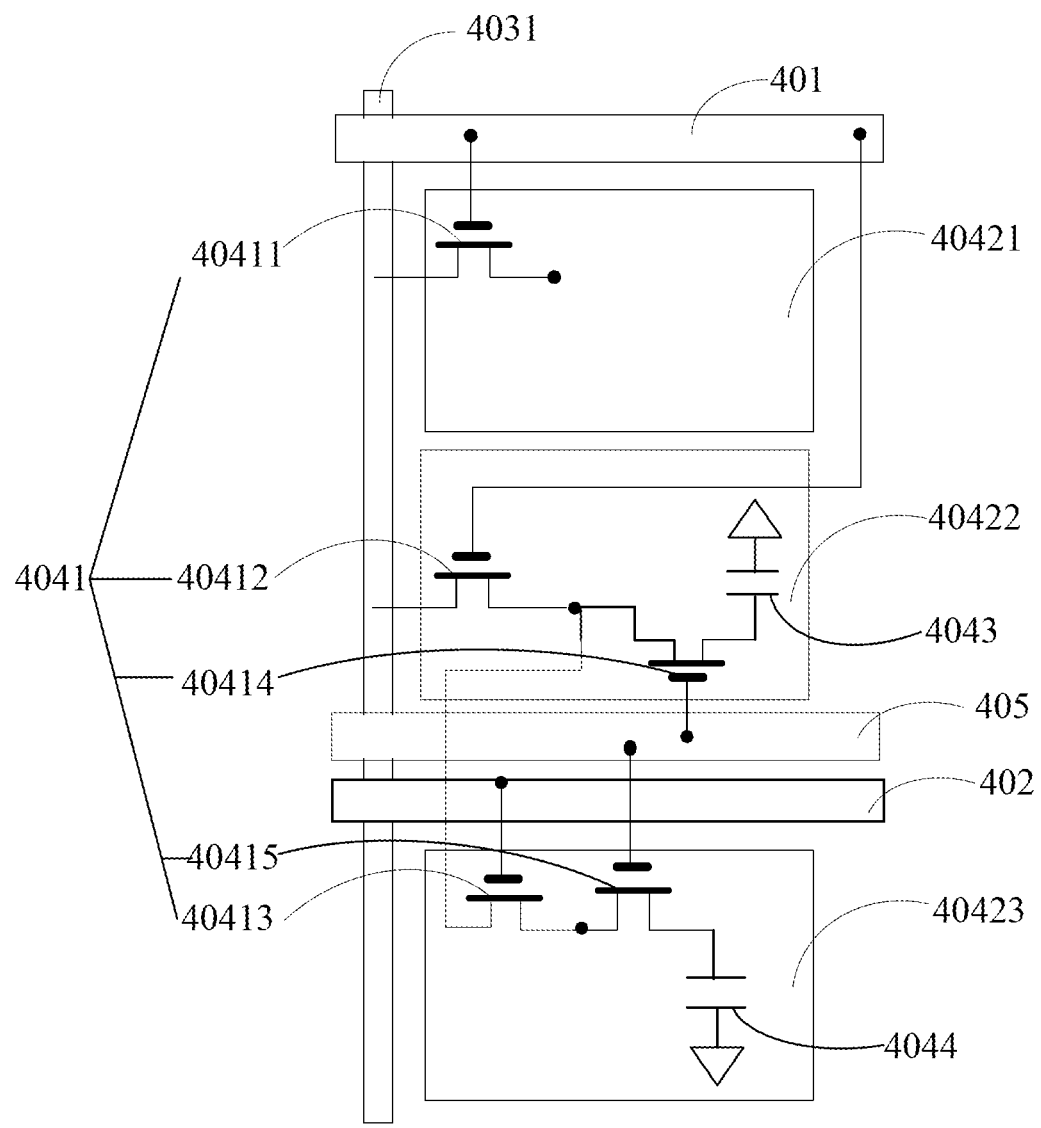
FIG. 9 is a schematic view showing the structure of another embodiment of a default voltage difference existing between at least two sub electrodes of the three sub electrodes of the pixel unit of the present invention.

Furthermore, refer to FIG. 9. Input terminal of third switch element 40413 can also be electrically connected to output terminal of second switch element 40412. First data line 4031 inputs voltage signal through second switch element 40412 to second sub electrode 40422. The voltage signal passes second switch element 40412 and then third switch element 40413 to third sub electrode 40423.

Similarly, in FIG. 9, except the variation of connection of input terminal of third switch element 40413 to output terminal of second switch element 40412, the remaining structure and elements are similar to those in FIG. 7, and the description will not be repeated here.

Figure 10:
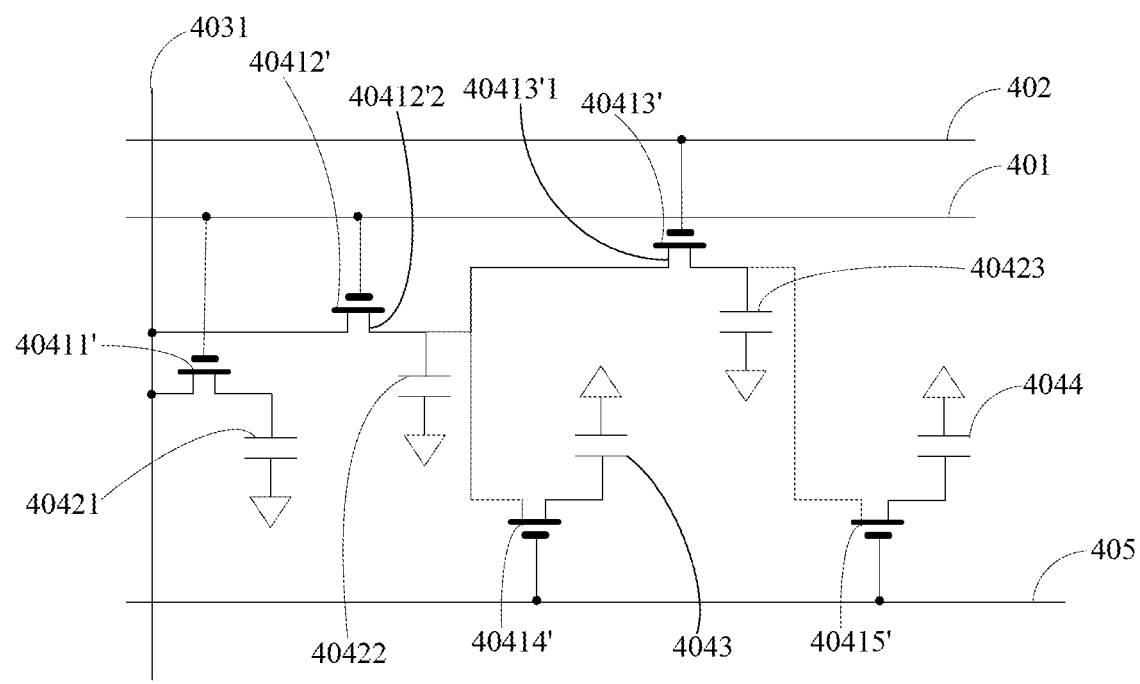
FIG. 10 is an equivalent circuit diagram of the switch element shown in FIG. 9 being a thin film transistor.

Referring to FIG. 10, FIG. 10 shows an equivalent circuit diagram of switch element 4041 of FIG. 9 as a thin film transistor. Third source terminal 40413' 1 of third thin film transistor 4013' is electrically connected to second drain terminal 40412' 2 of second thin film transistor 40412'. At this point, when the liquid crystal display panel enters 2D display mode, first data line 4031 inputs voltage signal required to display a same image through first thin film transistor 40411' and second thin film transistor 40412' to first sub electrode 40421 and second sub electrode 40422 respectively. The voltage signal passes second thin film transistor 40412' and third thin film transistor 40413' to third sub electrode 40423. Then, first scan line 401 and second scan line 402 stop inputting scan signal. Third scan line 405 inputs scan signal to control fourth thin film transistor 40414' and fifth thin film transistor 40415' to conduct. The voltage signal of second sub electrode 40422 passes though fourth thin film transistor 40414' and is coupled to first coupling capacitor 4043. The voltage signal of third sub electrode 40423 passes though fifth thin film transistor 40415' and is coupled to second coupling capacitor 4044. As such, voltage levels on second sub electrode 40422 and third sub electrode 40423 are changed. Depending on actual requirements of color polarization of large view angle, capacitances of first coupling capacitor 4043 and second coupling capacitor 4044 are adjusted to change voltage levels of second sub electrode 40422 and third sub electrode 40423 so that a default voltage difference exists between first sub electrode 40421 and second sub electrode 40422, between first sub electrode 40421 and third sub electrode 40423 respectively; or, a default voltage difference exists between any two of first sub electrode 40421, second sub electrode 40422 and third sub electrode 40423 respectively.

Figure 11:
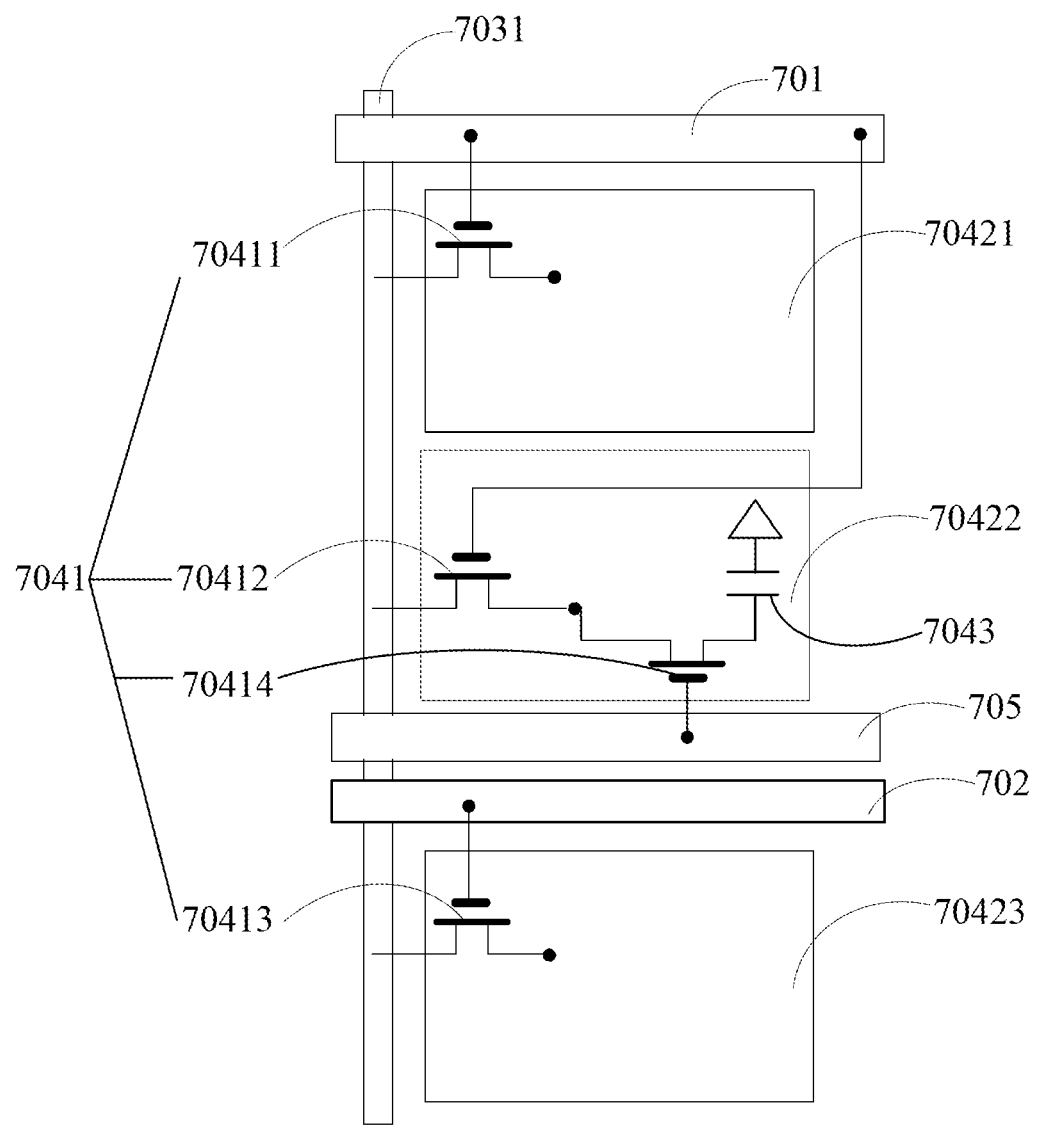
FIG. 11 is a schematic view showing the structure of yet another embodiment of a default voltage difference existing between at least two sub electrodes of the three sub electrodes of the pixel unit of the present invention.
Figure 12:
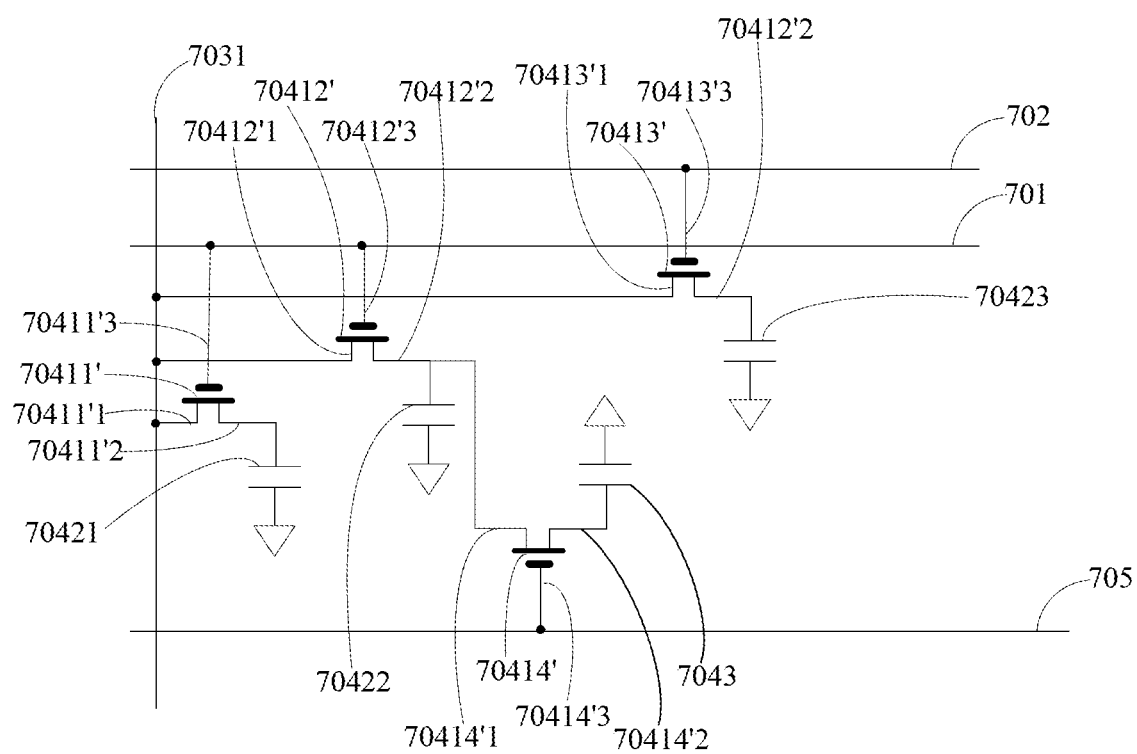
FIG. 12 is an equivalent circuit diagram of the switch element shown in FIG. 11 being a thin film transistor.

Refer to FIG. 11 and FIG. 3. FIG. 11 is a schematic view showing the structure of yet another embodiment of a default voltage difference existing between at least two sub electrodes of the three sub electrodes of the pixel unit of the present invention. Array substrate 10 comprises at least a plurality of third scan lines 705, and data line 103 further comprises a first data line 7031. Each pixel unit 104 corresponds to at least a third scan line 705 and first data line 7031. Switch elements 7041 of each pixel unit 104 further comprise: a fourth switch element 70414. Pixel unit 104 further comprises a first coupling capacitor 7043. The structure and the related connection of the pixel unit in this embodiment are similar to the embodiment of FIG. 7, except the fifth switch element and the second coupling capacitor; thus, the descriptions of the embodiment of FIG. 11 and Figure are omitted here. FIG. 12 is an equivalent circuit diagram of the switch element shown in FIG. 11 being a thin film transistor.

When the liquid crystal display panel enters 3D display mode, the 3D display drive theory is similar to the previous embodiment, and thus will not be repeated here.

Refer to FIG. 12. When the liquid crystal display panel enters 2D display mode, under condition of third source terminal 70413' 1 electrically connected to first data line 7031, first data line 7031 inputs a voltage signal to first sub electrode 70421, second sub electrode 70422 and third sub electrode 70423 so that three sub electrodes have the same voltage level. First scan line 701 and second scan line 702 are shut down, and third scan line 705 inputs scan signal to make fourth thin film transistor 70414' conductive. Because of first coupling capacitor 7043, the voltage signal of second sub electrode 70422 passes though fourth thin film transistor 70414' and is coupled to first coupling capacitor 7043. As such, voltage level on second sub electrode 70422 is changed. Depending on actual requirements of color polarization of large view angle, capacitances of first coupling capacitor 7043 is adjusted to change voltage level of second sub electrode 70422 so that a default voltage difference exists between second sub electrode 70422 and first sub electrode 70421, between second sub electrode 70422 and third sub electrode 70423 respectively. First sub electrode 70421 and third sub electrode 70423 maintain the same voltage.

As such, through electrical connection of second sub electrode 70422 to additional first coupling capacitor 7043, and changing capacitance of first coupling capacitor 7043, a default voltage difference exists between second sub electrode 70422 and first sub electrode 70421, between second sub electrode 70422 and third sub electrode 70423 respectively, so as to control polarization of liquid crystal molecules to improve the color difference in large view angle situation in 2D display mode, reduce color distortion and improve display result. Also, in 3D display mode, a default voltage difference exists between first sub electrode 70421, second sub electrode 70422, and third sub electrode 70423 is controlled by second scan line 302 alone to realize BM effect to solve the signal crosstalk problem to improve the color difference in large view angle situation and reduce color distortion.

Figure 13:
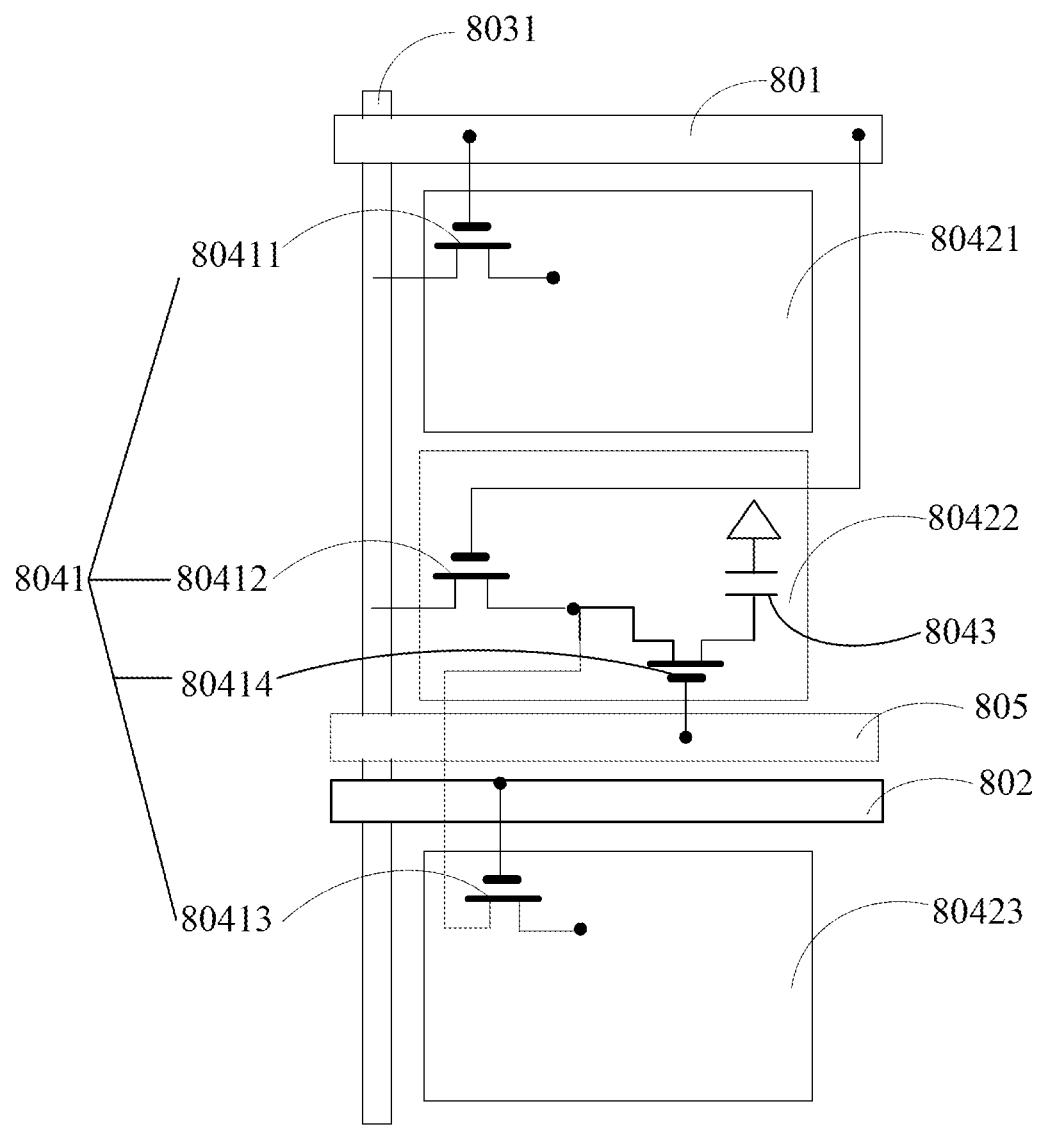
FIG. 13 is a schematic view showing the structure of yet another embodiment of a default voltage difference existing between at least two sub electrodes of the three sub electrodes of the pixel unit of the present invention.

Furthermore, refer to FIG. 13. Input terminal of third switch element 80413 can also be electrically connected to output terminal of second switch element 80412. First data line 8031 inputs voltage signal through second switch element 80412 to second sub electrode 80422. The voltage signal passes second switch element 80412 and then third switch element 80413 to third sub electrode 80423.

In FIG. 13, except the variation of connection of input terminal of third switch element 80413 to output terminal of second switch element 80412, the remaining structure and elements are similar to those in FIG. 11, and the description will not be repeated here.

Figure 14:
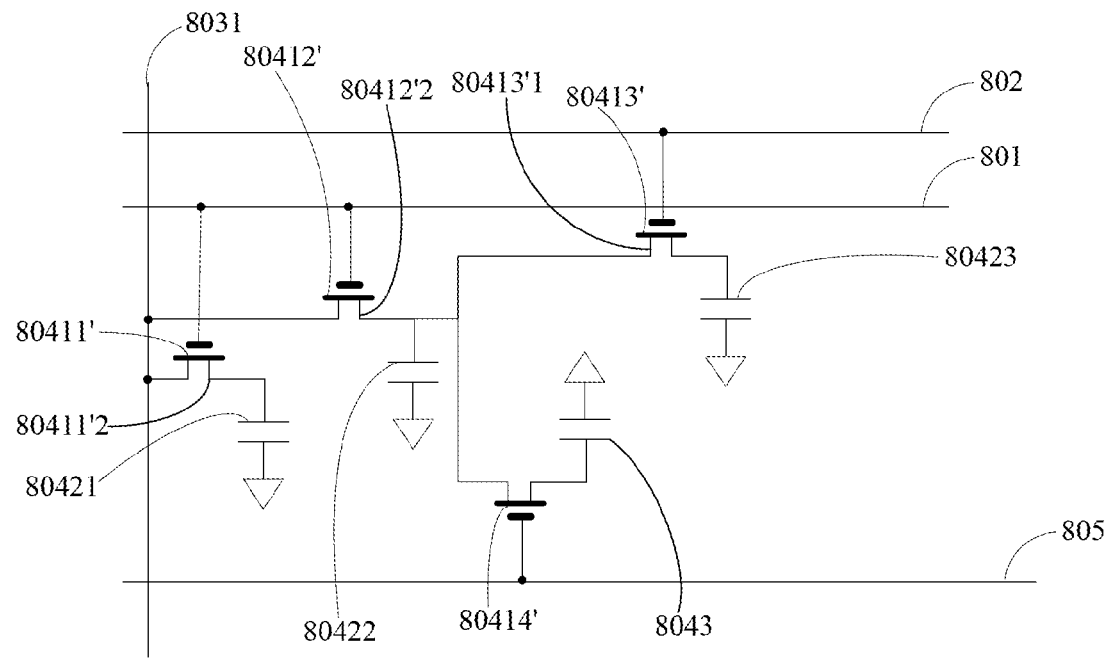
FIG. 14 is an equivalent circuit diagram of the switch element shown in FIG. 13 being a thin film transistor.

Referring to FIG. 14, FIG. 14 shows an equivalent circuit diagram of switch element of FIG. 13 as a thin film transistor. Third source terminal 80413' 1 of third thin film transistor 8013' is electrically connected to second drain terminal 80412' 2 of second thin film transistor 80412'. At this point, when the liquid crystal display panel enters 2D display mode, first data line 8031 inputs voltage signal required to display a same image through first thin film transistor 80411' and second thin film transistor 80412' to first sub electrode 80421 and second sub electrode 80422 respectively. The voltage signal passes second thin film transistor 80412' and third thin film transistor 80413' to third sub electrode 80423. Then, first scan line 801 and second scan line 802 stop inputting scan signal. Third scan line 805 inputs scan signal to control fourth thin film transistor 80414' to conduct. The voltage signal of second sub electrode 80422 passes though fourth thin film transistor 80414' and is coupled to first coupling capacitor 8043. As such, voltage level on second sub electrode 80422 is changed. Depending on actual requirements of color polarization of large view angle, capacitance of first coupling capacitor 4043 is adjusted so that a default voltage difference exists between second sub electrode 80422 and first sub electrode 80421, between second sub electrode 80422 and third sub electrode 80423 respectively.

It should be noted that third source terminal 80413' 1 of third thin film transistor 80413' in the instant embodiment can also be electrically connected to first drain terminal 80411' 2 of first thin film transistor 80411'. At this point, when the liquid crystal display panel enters 2D display mode, a same voltage signal inputted to first sub electrode, second sub electrode and third sub electrode. The adjusted capacitance of first coupling capacitor 8043 make a default voltage difference exist between second sub electrode 80422 and first sub electrode 80421, between second sub electrode 80422 and third sub electrode 80423 respectively. The remaining of the connection and drive theory are similar to the previous embodiment, and thus the descriptions are omitted here.

Figure 15:
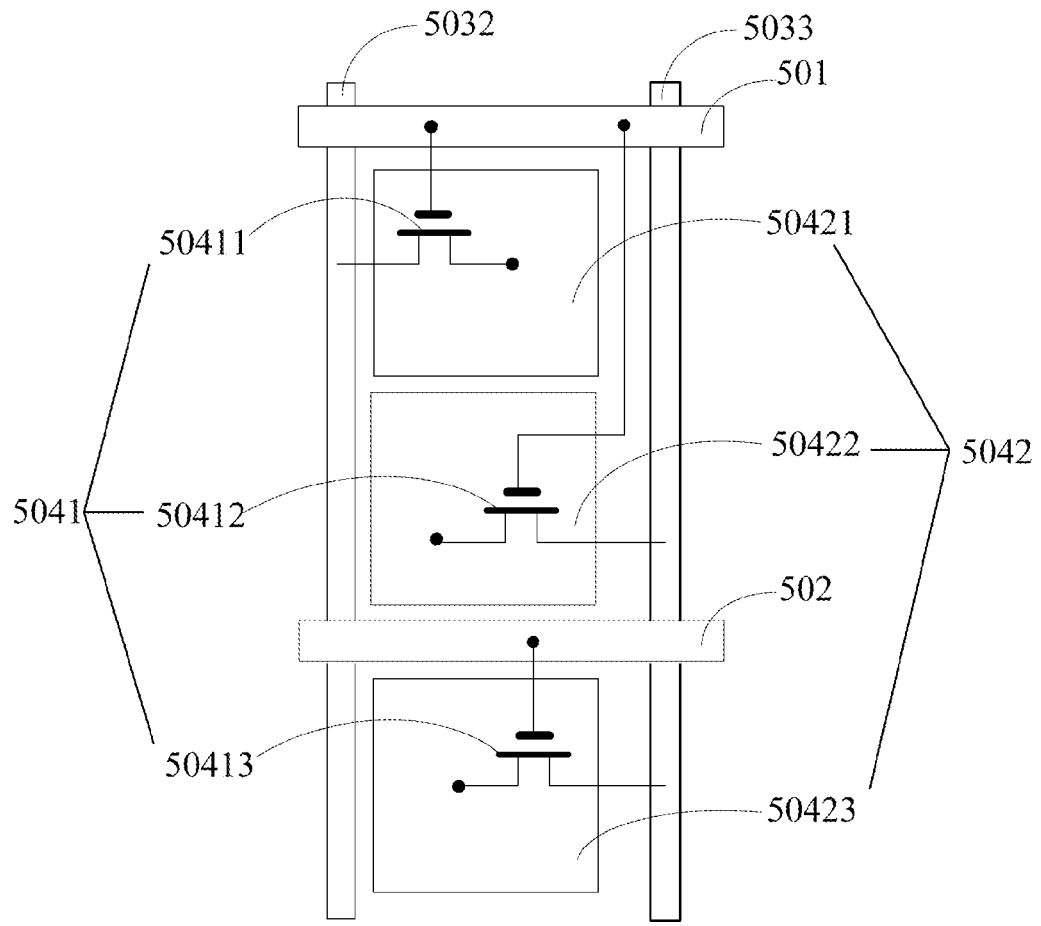
FIG. 15 is a schematic view showing the structure of yet another embodiment of a default voltage difference existing between at least two sub electrodes of the three sub electrodes of the pixel unit of the present invention.

Refer to FIG. 15 and FIG. 3. FIG. 15 is a schematic view showing the structure of yet another embodiment of a default voltage difference existing between at least two sub electrodes of the three sub electrodes of the pixel unit of the present invention. Data line 103 of array substrate 10 further comprises a second data line 5032 and a third data line 5033. Each pixel unit 104 corresponds to at least a second data line 5032 and a third data line 5033.

In the instant embodiment, input terminal of first switch element 50411 is electrically connected to second data line 5032. Input terminals of second switch element 50412 and third switch element 50413 are electrically connected to third data line 5033. When the liquid crystal display panel enters 3D display mode, second scan line 502 inputs a scan signal to third switch element 50413 to make third switch element 50413 conductive. Third data line 5033 inputs a voltage signal corresponding to BM image through third switch element 50413 to third sub electrode 50423 to perform "clearing screen" on third sub electrode 50423 to make third sub electrode 50423 display a black image. Then, second scan line 502 stop inputting scan signal to keep third sub electrode 50423 to maintain black image. Then, first scan line 501 inputs scan signal to make first switch element 50411 and second switch element 50412 conductive. Second data line 5032 and third data line 5033 input voltage signal corresponding to a same image to be displayed through first switch element 50411 and second switch element 50412 respectively to first sub electrode 50421 and second sub electrode 50422 to make difference exist between inputted voltage signal from second data line 5032 and third data line 5033 so that a default voltage difference exists between first sub electrode 50421 and second sub electrode 50422.

Figure 16:
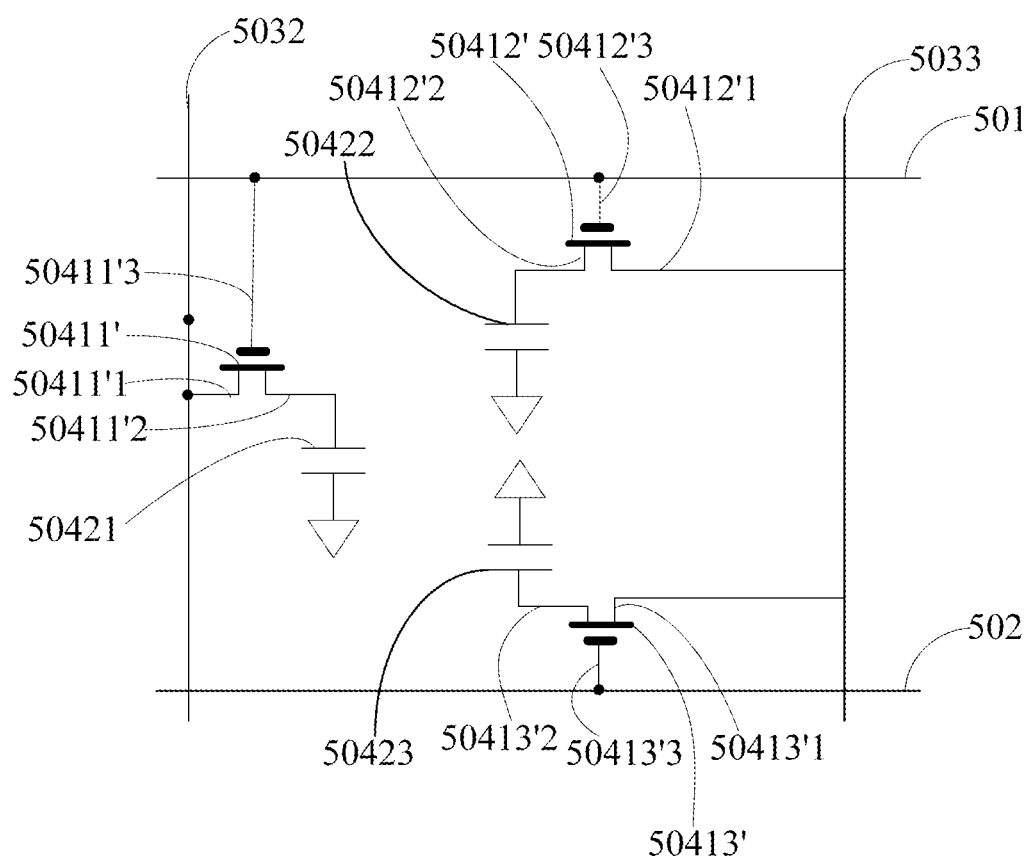
FIG. 16 is an equivalent circuit diagram of the switch element shown in FIG. 15 being a thin film transistor.

Refer ring to FIG. 16, switch element 5042 is three-terminal control switch. Take thin film transistor as example. First switch element 50411, second switch element 50412 and third switch element 50413 are first thin film transistor 50411', second thin film transistor 50412' and third thin film transistor 50413', respectively.

In the instant embodiment, first thin film transistor 50411' comprises a first gate terminal 50411' 3, a first source terminal 50411' 1 and a first drain terminal 50411' 2. First gate terminal 50411' 3, first source terminal 50411' 1 and first drain terminal 50411' 2 are used as control terminal, input terminal and output terminal of first thin film transistor 50411' respectively. First source terminal 50411' 1 is electrically connected to second data line 5032. First drain terminal 50411' 2 is electrically connected to first sub electrode 50421. First gate terminal 50411' 3 is electrically connected to first scan line 501 to control conduction and disconduction of first thin film transistor 50411'.

Second thin film transistor 50412' comprises a second gate terminal 50412' 3, a second source terminal 50412' 1 and a second drain terminal 50412' 2. Second gate terminal 50412' 3, second source terminal 50412' 1 and second drain terminal 50412' 2 are used as control terminal, input terminal and output terminal of second thin film transistor 50412' respectively. Second source terminal 50412' 1 is electrically connected to third data line 5033. Second drain terminal 50412' 2 is electrically connected to second sub electrode 50422. Second gate terminal 50411' 3 is electrically connected to first scan line 501 to control conduction and disconduction of second thin film transistor 30412'.

Third thin film transistor 50413' comprises a third gate terminal 50413' 3, a third source terminal 50413' 1 and a third drain terminal 50412' 2. Third gate terminal 50413' 3, third source terminal 50413' 1 and third drain terminal 50413' 2 are used as control terminal, input terminal and output terminal of third thin film transistor 50413' respectively. Third source terminal 50413' 1 is electrically connected to third data line 5033. Third drain terminal 50413' 2 is electrically connected to third sub electrode 50423. Third gate terminal 50413' 3 is electrically connected to second scan line 502 to control conduction and disconduction of third thin film 50413'.

When the liquid crystal display panel enters 2D display mode, first scan line 501 and second scan line 502 respectively input scan signal to make first thin film transistor 50411', second thin film transistor 50412' and third thin film transistor 50413' conductive. Second data line 5032 inputs a first voltage signal required to display a same image through first thin film transistor 50411', to first sub electrode 50421. Third data line 5033 inputs a second voltage signal required to display the image through second thin film transistor 50411' and third thin film transistor 50412' respectively to second sub electrode 50422 and third sub electrode 50423. Depending on actual requirement of color polarization of view angle, a default voltage difference exists between first sub electrode 50411 and second sub electrode 50422, between first sub electrode 50411 and third sub electrode 50423 respectively, while second sub electrode 50422 and third sub electrode 50423 have same voltage level.

As such, through second data line 5032 inputting voltage signal to first sub electrode 50421, third data line 5033 inputting voltage signal to second sub electrode 50422 and third sub electrode 50423 respectively, because a difference exists between the voltage signal inputted by second data line 5032 and the voltage signal inputted by third data line 5033, a default voltage difference exists between first sub electrode 50411 and second sub electrode 50422, between first sub electrode 50411 and third sub electrode 50423 respectively so as to control polarization of liquid crystal molecules to improve the color difference in large view angle situation in 2D and 3D display modes, reduce color distortion and improve display result. Also, third sub electrode 50423 is controlled by second scan line 502 alone to realize BM effect to solve the signal crosstalk problem. In 2D display mode, third sub electrode 50423 is opened normally so as to improve luminance of the liquid crystal display panel in 2D display mode and opening ratio of the pixel unit.

Figure 17:
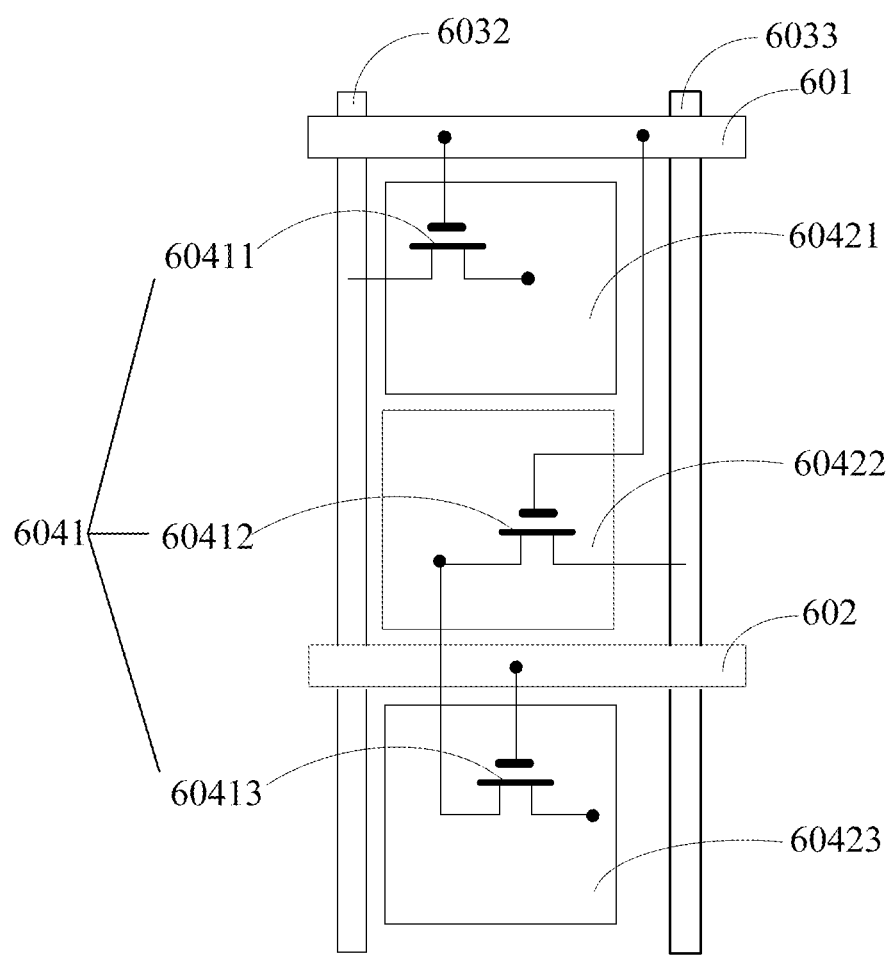
FIG. 17 is a schematic view showing the structure of yet another embodiment of a default voltage difference existing between at least two sub electrodes of the three sub electrodes of the pixel unit of the present invention.

Furthermore, refer to FIG. 17. Input terminal of third switch element 60413 can also be electrically connected to output terminal of second switch element 60412. Third data line 6033 inputs voltage signal through second switch element 60412 to second sub electrode 60422. The voltage signal passes second switch element 60412 and then third switch element 60413 to third sub electrode 60423.

Figure 18:
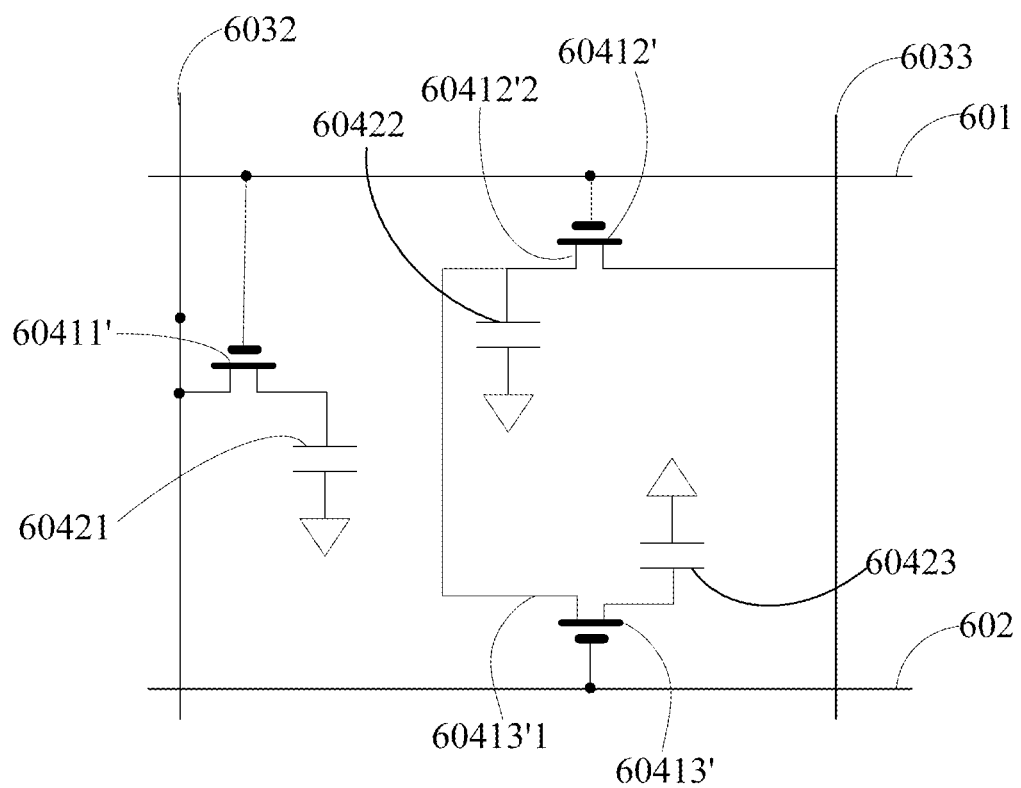
FIG. 18 is an equivalent circuit diagram of the switch element shown in FIG. 17 being a thin film transistor.

Specifically, FIG. 18 shows an equivalent circuit diagram of switch element 6041 of FIG. 17 as a thin film transistor. Third source terminal 60413' 1 of third thin film transistor 6013' is electrically connected to second drain terminal 60412' 2 of second thin film transistor 60412'. At this point, when the liquid crystal display panel enters 2D display mode, first scan line 601 and second scan line 602 input scan signal respectively to make first thin film transistor 60411', second thin film transistor 60412' and third thin film transistor 60413'. Second data line 6032 inputs a first voltage signal required to display a same image through first thin film transistor 60411' to first sub electrode 60421. Third data line 6033 inputs a second voltage signal required to display a same image through second thin film transistor 60412' to second sub electrode 60422. The second voltage signal passes second thin film transistor 60412' and then third thin film transistor 60413' to third sub electrode 60423. Depending on actual requirements of color polarization of large view angle, a difference exists between the voltage signal inputted by second data line 6032 and the voltage signal inputted by third data line 6033 so that a default voltage difference exists between first sub electrode 60421 and second sub electrode 60422, between first sub electrode 60421 and third sub electrode 60423 respectively.

It should be noted that third source terminal 60413' 1 of third thin film transistor 60413' in the instant embodiment can also be electrically connected to first drain terminal 60411' 2 of first thin film transistor 60411'. At this point, when the liquid crystal display panel enters 2D display mode, second data line 6032 inputs a first voltage signal required to display a same image to first thin film transistor 60411'. The first voltage signal passes first thin film transistor 60411' to third thin film transistor 60413' so that first sub electrode 60421 and third sub electrode 60423 have a same voltage level. Third data line 6033 inputs a second voltage signal required to display a same image to second thin film transistor 60412' a difference exists between the first voltage signal and the second voltage signal, so that a default voltage difference exists between second sub electrode 60422 and first sub electrode 60421, between second sub electrode 60422 and third sub electrode 60423 respectively. The remaining of the connection and drive theory are similar to the previous embodiment, and thus the descriptions are omitted here.

The present invention further provides an embodiment of a liquid crystal display panel, comprising an array substrate described in any of aforementioned embodiments.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate for VA (vertical alignment) liquid crystal display panel, which comprises:
    at least a plurality of first scan lines, a plurality of second scan lines, a plurality of data lines and a plurality of pixel units arranged in a matrix form; each of the plurality of pixel units further comprising: switch element and pixel electrode, and each of the plurality of pixel units corresponding to at least one of the plurality of first scan lines, one of the plurality of second scan lines and one of the plurality of data lines;
    the pixel electrode at least comprising a first sub electrode, a second sub electrode and a third sub electrode;
    number of the switch element of each of the plurality of pixel units being at least three, comprising a first switch element, a second switch element and a third switch element, respectively;
    output terminals of the first switch element, the second switch element and the third switch element being electrically connected to the first sub electrode, the second sub electrode and the third sub electrode, respectively; input terminals of the first switch element and the second switch element being electrically connected to the one of the plurality of data lines; control terminals of the first switch element and the second switch element being electrically connected to the one of the plurality of first scan lines individually, and control terminal of the third switch element being electrically connected to the one of the plurality of second scan lines;
    wherein under condition of input terminal of the third switch element being electrically connected to the one of the plurality of data lines, the one of the plurality of second scan lines inputting scan signal to control the third switch element to conduct when entering 3D display mode, the one of the plurality of data lines inputting a voltage signal corresponding to BM (black matrix) image through the third switch element to the third sub electrode, and then stopping inputting scan signal to the one of the plurality of second scan lines; after stopping inputting scan signal to the one of the plurality of second scan lines, the one of the plurality of first scan lines inputting scan signal to control the first switch element and the second switch element to conduct, the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode;

when entering 2D display mode, the one of the plurality of first scan lines and the one of the plurality of second scan lines inputting scan signal respectively to control the first switch element, the second switch element and the third switch element to conduct, the one of the plurality of data lines inputting voltage signal corresponding to a same image to be displayed through the first switch element, the second switch element and the third switch element respectively to the first sub electrode, the second sub electrode and the third sub electrode, and controlling a default voltage difference existing between at least two sub electrodes of the first sub electrode, the second sub electrode and the third sub electrode.

2. The array substrate as claimed in claim 1, characterized in that:

the array substrate comprises at least a plurality of third scan lines, the plurality of data lines comprises a first data line, each of the plurality of pixel units corresponds to at least one of the plurality of third scan lines and the first data line;

the switch elements of each pixel unit further comprise: a fourth switch element and a fifth switch element;

the pixel unit further comprises a first coupling capacitor and a second coupling capacitor;

output terminals of the fourth switch element and the fifth switch element are electrically connected to the first coupling capacitor and the second coupling capacitor, respectively; input terminals of the first switch element, the second switch element and the third switch element are electrically connected to the first data line, input terminals of the fourth switch element and the fifth switch element are electrically connected to the second sub electrode and the third sub electrode respectively, control terminals of the fourth switch element and the fifth switch element are electrically connected to the one of the plurality of third scan lines individually;

wherein a condition of when entering 3D display mode, the one of the plurality of data lines inputting a voltage signal corresponding to BM image through the third switch element to the third sub electrode means that the first data line inputs a voltage signal corresponding to BM image through the third switch element to the third sub electrode;

a condition of the one of the plurality of data lines inputs voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the one of the plurality of first scan lines; after stopping inputting scan signal to the one of the plurality of first scan lines, the one of the plurality of third scan lines inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

3. An array substrate for liquid crystal display panel, which comprises:

at least a plurality of first scan lines, a plurality of second scan lines, a plurality of data lines and a plurality of pixel units arranged in a matrix form; each of the plurality of pixel units further comprising: switch element and pixel electrode, and each of the plurality of pixel units corresponding to at least one of the plurality of first scan lines, one of the plurality of second scan lines and one of the plurality of data lines;

the pixel electrode at least comprising a first sub electrode, a second sub electrode and a third sub electrode;

number of the switch element of each of the plurality of pixel units being at least three, comprising, a first switch element, a second switch element and a third switch element, respectively;

output terminals of the first switch element, the second switch element and the third switch element being electrically connected to the first sub electrode, the second sub electrode and the third sub electrode, respectively; input terminals of the first switch element, the second switch element and the third switch element being electrically connected to the one of the plurality of data lines; control terminals of the first switch element and the second switch element being electrically connected to the one of the plurality of first scan lines individually, and control terminal of the third switch element being electrically connected to the one of the plurality of second scan lines;

wherein the one of the plurality of second scan lines inputting scan signal to control the third switch element to conduct when entering 3D display mode, the one of the plurality of data lines inputting a voltage signal corresponding to BM (black matrix) image through the third switch element to the third sub electrode, and then stopping inputting scan signal to the one of the plurality of second scan lines; after stopping inputting scan signal to the one of the plurality of second scan lines, the one of the plurality of first scan lines inputting scan signal to control the first switch element and the second switch element to conduct, the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode.

4. The array substrate as claimed in claim 3, characterized in that:

when entering 2D display mode, the one of the plurality of first scan lines and the one of the plurality of second scan lines input scan signal respectively to control the first switch element, the second switch element and the third switch element to conduct, the one of the plurality of data lines inputs voltage signal corresponding to a same image to be displayed through the first switch element, the second switch element and the third switch element respectively to the first sub electrode, the second sub electrode and the third sub electrode, and controls a default voltage difference existing between at least two sub electrodes of the first sub electrode, the second sub electrode and the third sub electrode.

5. The array substrate as claimed in claim 4, characterized in that:

the array substrate comprises at least a plurality of third scan lines, the plurality of data lines comprises a first data line, each pixel unit corresponds to at least one of the plurality of third scan lines and the first data line;

the switch elements of each pixel unit further comprise: a fourth switch element and a fifth switch element;

the pixel unit further comprises a first coupling capacitor and a second coupling capacitor;

output terminals of the fourth switch and the fifth switch are electrically connected to the first coupling capacitor and the second coupling capacitor, respectively; input terminals of the first switch element, the second switch element and the third switch element are electrically connected to the first data line, input terminals of the fourth switch element and the fifth switch element are electrically connected to the second sub electrode and the third sub electrode respectively, control terminals of the fourth switch element and the fifth switch element are electrically connected to the one of the plurality of third scan lines individually;

wherein a condition of when entering 3D display mode, the one of the plurality of data lines inputting a voltage signal corresponding to BM image through the third switch element to the third sub electrode means that the first data line inputs a voltage signal corresponding to BM image through the third switch element to the third sub electrode;

a condition of the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the one of the plurality of first scan lines; after stopping inputting scan signal to the one of the plurality of first scan lines, the one of the plurality of third scan lines inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

6. The array substrate as claimed in claim 5, characterized in that:

the first switch element, the second switch element, the third switch element, the fourth switch element and the fifth switch element are a first thin film transistor, a second thin film transistor, a third thin film transistor, a fourth thin film transistor and a fifth thin film transistor respectively;

the first thin film transistor comprises a first gate terminal, a first source terminal and a first drain terminal, the first source terminal is electrically connected to the first data line, the first drain terminal is electrically connected to the first sub electrode, and the first gate terminal is electrically connected to the one of the plurality of first scan lines to control the conduction and disconduction of the first thin film transistor;

the second thin film transistor comprises a second gate terminal, a second source terminal and a second drain terminal, the second source terminal is electrically connected to the first data line, the second drain terminal is electrically connected to the second sub electrode, and the second gate terminal is electrically connected to the one of the plurality of first scan lines to control the conduction and disconduction of the second thin film transistor;

the third thin film transistor comprises a third gate terminal, a third source terminal and a third drain terminal, the third source terminal is electrically connected to the first data line or the second drain terminal of the second thin film transistor, the third drain terminal is electrically connected to the third sub electrode, and the third gate terminal is electrically connected to the one of the plurality of second scan lines to control the conduction and disconduction of the third thin film transistor;

the fourth thin film transistor comprises a fourth gate terminal, a fourth source terminal and a fourth drain terminal, the fourth source terminal is electrically connected to the second sub electrode, the fourth drain terminal is electrically connected to the first coupling capacitor, and the fourth gate terminal is electrically connected to the one of the plurality of third scan lines to control the conduction and disconduction of the fourth thin film transistor; and the fifth thin film transistor comprises a fifth gate terminal, a fifth source terminal and a fifth drain terminal, the fifth source terminal is electrically connected to the third sub electrode, the fifth drain terminal is electrically connected to the second coupling capacitor, and the fifth gate terminal is electrically connected to the one of the plurality of third scan lines to control the conduction and disconduction of the fifth thin film transistor.

7. The array substrate as claimed in claim 6, characterized in that:

when entering 2D display mode, under condition of the third source terminal electrically connected to the first data line, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the first data line inputting voltage signal corresponding to a same image to be displayed through the first thin film transistor, the second thin film transistor and the third thin film transistor to the first sub electrode, the second sub electrode and the third sub electrode respectively, and then stopping inputting scan signal to the one of the plurality of first scan lines and the one of the plurality of second scan lines; after stopping inputting scan signal to the one of the plurality of first scan lines and the one of the plurality of second scan lines, the one of the plurality of third scan lines inputting scan signal to control the fourth thin film transistor and the fifth thin film transistor to conduct, voltage signal of the second sub electrode passing though the fourth thin film transistor and coupled to the first coupling capacitor, voltage signal of the third sub electrode passing though the fifth thin film transistor and coupled to the second coupling capacitor, adjusting the first coupling capacitor and the second coupling capacitor so that the first sub electrode having a default voltage difference with the second sub electrode and the third electrode respectively, or default voltage difference existing among the first sub electrode, the second sub electrode and the third sub electrode;

under condition of the third source terminal and the second drain terminal of the second thin film transistor electrically connected, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the first data line inputting voltage signal corresponding to a same image to be displayed through the first thin film transistor and the second thin film transistor to the first sub electrode and the second sub electrode respectively, voltage signal passing through the second thin film transistor and the third thin film transistor to the third sub electrode, and then stopping inputting scan signal to the one of first scan lines and the one of the plurality of second scan lines; after stopping inputting scan signal to the one of the plurality of first scan lines and the one of the plurality of second scan lines, the one of the plurality of third scan lines inputting scan signal to control the fourth thin film transistor and the fifth thin film transistor to conduct, voltage signal of the second sub electrode passing though the fourth thin film transistor and coupled to the first coupling capacitor, voltage signal of the third sub electrode passing though the fifth thin film transistor and coupled to the second coupling capacitor, adjusting the first coupling capacitor and the second coupling capacitor so that the first sub electrode having a default voltage difference with the second sub electrode and the third electrode respectively, or default voltage difference existing among the first sub electrode, the second sub electrode and the third sub electrode.

8. The array substrate as claimed in claim 3, characterized in that:

the array substrate comprises at least a plurality of third scan lines, the plurality of data lines comprise a first data line, each pixel unit corresponds to at least one of the plurality of third scan lines and the first data line;

the switch elements of each pixel unit further comprise: a fourth switch element;

the pixel unit further comprises a first coupling capacitor;

output terminal of the fourth switch element is electrically connected to the first coupling capacitor; input terminals of the first switch element, the second switch element and the third switch element are electrically connected to the first data line, input terminal of the fourth switch element is electrically connected to the second sub electrode, control terminal of the fourth switch element is electrically connected to the one of the plurality of third scan lines;

wherein a condition of when entering 3D display mode, the one of the plurality of data lines inputting a voltage signal corresponding to BM image through the third switch element to the third sub electrode means that the first data line inputs a voltage signal corresponding to BM image through the third switch element to the third sub electrode;

a condition of the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode means that the first data line inputs voltage signal corresponding to a same image to be displayed through the first switch element and the second switch element respectively to the first sub electrode and the second sub electrode, and stops inputting scan signal to the one of the plurality of first scan lines; after stopping inputting scan signal to the one of the plurality of first scan lines, the one of the plurality of third scan lines inputs scan signal to control the fourth switch element to conduct, the voltage signal of the second sub electrode passes the fourth switch element and is coupled to the first coupling capacitor, capacitance of the first coupling capacitor is adjusted so that a default voltage difference exists between the first sub electrode and the second sub electrode.

9. The array substrate as claimed in claim 8, characterized in that:

the first switch element, the second switch element, the third switch element and the fourth switch element are a first thin film transistor, a second thin film transistor, a third thin film transistor and a fourth thin film transistor respectively;

the first thin film transistor comprises a first gate terminal, a first source terminal and a first drain terminal, the first source terminal is electrically connected to the first data line, the first drain terminal is electrically connected to the first sub electrode, and the first gate terminal is electrically connected to the one of the plurality of first scan lines to control the conduction and disconduction of the first thin film transistor;

the second thin film transistor comprises a second gate terminal, a second source terminal and a second drain terminal, the second source terminal is electrically connected to the first data line, the second drain terminal is electrically connected to the second sub electrode, and the second gate terminal is electrically connected to the one of the plurality of first scan lines to control the conduction and disconduction of the second thin film transistor;

the third thin film transistor comprises a third gate terminal, a third source terminal and a third drain terminal, the third source terminal is electrically connected to the first data line, the second drain terminal of the second thin film transistor or the first drain terminal of the first thin film transistor, the third drain terminal is electrically connected to the third sub electrode, and the third gate terminal is electrically connected to the one of the plurality of second scan lines to control the conduction and disconduction of the third thin film transistor; and the fourth thin film transistor comprises a fourth gate terminal, a fourth source terminal and a fourth drain terminal, the fourth source terminal is electrically connected to the second sub electrode, the fourth drain terminal is electrically connected to the first coupling capacitor, and the fourth gate terminal is electrically connected to the one of the plurality of third scan lines to control the conduction and disconduction of the fourth thin film transistor.

10. The array substrate as claimed in claim 9, characterized in that:

when entering 2D display mode, under condition of the third source terminal electrically connected to the first data line, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the first data line inputting voltage signal corresponding to a same image to be displayed through the first thin film transistor, the second thin film transistor and the third thin film transistor to the first sub electrode, the second sub electrode and the third sub electrode respectively, and then stopping inputting scan signal to the one of the plurality of first scan lines and the one of the plurality of second scan lines; after stopping inputting scan signal to the one of the plurality of first scan lines and the one of the plurality of second scan lines, the one of the plurality of third scan lines inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively;

under condition of the third source terminal and the second drain terminal of the second thin film transistor electrically connected, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the first data line inputting voltage signal corresponding to a same image to be displayed through the first thin film transistor and the second thin film transistor to the first sub electrode and the second sub electrode respectively, voltage signal passing through the second thin film transistor and the third thin film transistor to the third sub electrode, and then stopping inputting scan signal to the one of the plurality of first scan lines and the one of the plurality of second scan lines; after stopping inputting scan signal to the one of the plurality of first scan lines and the one of the plurality of second scan lines, the one of the plurality of third scan lines inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively;

under condition of the third source terminal and the first drain terminal of the first thin film transistor electrically connected, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the first data line inputting voltage signal corresponding to a same image to be displayed through the first thin film transistor and the second thin film transistor to the first sub electrode and the second sub electrode respectively, voltage signal passing through the first thin film transistor and the third thin film transistor to the third sub electrode, and then stopping inputting scan signal to the one of the plurality of first scan lines and the one of the plurality of second scan lines; after stopping inputting scan signal to the one of the plurality of first scan lines and the one of the plurality of second scan lines, the one of the plurality of third scan lines inputting scan signal to control the fourth thin film transistor to conduct, voltage signal of the second sub electrode passing though the fourth thin film transistor and coupled to the first coupling capacitor, adjusting the first coupling capacitor so that the second sub electrode having a default voltage difference with the first sub electrode and the third electrode respectively.

11. The array substrate as claimed in claim 3, characterized in that:

the plurality of data lines further comprises a second data line and a third data line; each pixel unit corresponds to at least one second data line and one third data line;

input terminal of the first switch element is electrically connected to the second data line, input terminals of the second switch element and the third switch element are electrically connected to the third data line respectively;

wherein a condition of when entering 3D display mode, the one of the plurality of data lines inputting a voltage signal corresponding to BM image through the third switch element to the third sub electrode means that the third data line inputs a voltage signal corresponding to BM image through the third switch element to the third sub electrode;

a condition of the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode means that the second data line and the third data line input voltage signal corresponding to a same image to be displayed through the first switch element and the second switch element respectively to the first sub electrode and the second sub electrode to make difference exist between inputted voltage signal from the second data line and the third data line so that a default voltage difference exists between the first sub electrode and the second sub electrode.

12. The array substrate as claimed in claim 11, characterized in that:

the first switch element, the second switch element and the third switch element are a first thin film transistor, a second thin film transistor and a third thin film transistor respectively;

the first thin film transistor comprises a first gate terminal, a first source terminal and a first drain terminal, the first source terminal is electrically connected to the second data line, the first drain terminal is electrically connected to the first sub electrode, and the first gate terminal is electrically connected to the one of the plurality of first scan lines to control the conduction and disconduction of the first thin film transistor;

the second thin film transistor comprises a second gate terminal, a second source terminal and a second drain terminal, the second source terminal is electrically connected to the third data line, the second drain terminal is electrically connected to the second sub electrode, and the second gate terminal is electrically connected to the one of the plurality of first scan lines to control the conduction and disconduction of the second thin film transistor; and the third thin film transistor comprises a third gate terminal, a third source terminal and a third drain terminal, the third source terminal is electrically connected to the third data line, the second drain terminal of the second thin film transistor or the first drain terminal of the first thin film transistor, the third drain terminal is electrically connected to the third sub electrode, and the third gate terminal is electrically connected to the one of the plurality of second scan lines to control the conduction and disconduction (i.e., on and off) of the third thin film transistor.

13. The array substrate as claimed in claim 12, characterized in that:

when entering 2D display mode, under condition of the third source terminal electrically connected to the third data line, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the second data line inputting a first voltage signal corresponding to a same image to be displayed through the first thin film transistor to the first sub electrode, the third data line inputting a second voltage signal corresponding to a same image to be displayed through the second thin film transistor and the third thin film transistor to the second sub electrode and the third sub electrode respectively, so that a difference existing between the first voltage signal and the second voltage signal to make a default voltage difference existing between the first sub pixel and the second sub electrode and between the first sub electrode and the third electrode respectively;

under condition of the third source terminal and the second drain terminal of the second thin film transistor electrically connected, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the second data line inputting a first voltage signal corresponding to a same image to be displayed through the first thin film transistor to the first sub electrode, the third data line inputting a second voltage signal corresponding to a same image to be displayed through the second thin film transistor to the second sub electrode, the second voltage signal passing through the second thin film transistor and the third thin film transistor to the third sub electrode, so that a difference existing between the first voltage signal and the second voltage signal to make a default voltage difference existing between the first sub pixel and the second sub electrode and between the first sub electrode and the third sub electrode respectively;

under condition of the third source terminal and the first drain terminal of the first thin film transistor electrically connected, the one of the plurality of data lines inputting voltage signal corresponding to a same image to be displayed through the first switch element, the second switch element and the third switch element to the first sub electrode, the second sub electrode and the third sub electrode respectively, and controlling a default voltage difference existing between at least two sub electrodes selected from the first sub electrode, the second sub electrode and the third sub electrode means that:

the second data line inputting a first voltage signal corresponding to a same image to be displayed through the first thin film transistor to the first sub electrode, the first voltage signal passing through the first thin film transistor and the third thin film transistor to the third sub electrode, the third data line inputting a second voltage signal corresponding to a same image to be displayed through the second thin film transistor to the second sub electrode, so that a difference existing between the first voltage signal and the second voltage signal to make a default voltage difference existing between the first sub pixel and the second sub electrode and between the first sub electrode and the third sub electrode respectively.

14. A liquid crystal display panel, which comprises: an array substrate;

the array substrate further comprising: at least a plurality of first scan lines, a plurality of second scan lines, a plurality of data lines and a plurality of pixel units arranged in a matrix form; each of the plurality of pixel units further comprising: switch element and pixel electrode, and each of the plurality of pixel units corresponding to at least one of the plurality of first scan lines, one of the plurality of second scan lines and one of the plurality of data lines;

the pixel electrode at least comprising a first sub electrode, a second sub electrode and a third sub electrode;

number of the switch element of each of the plurality of pixel units being at least three, comprising, a first switch element, a second switch element and a third switch element, respectively;

output terminals of the first switch element, the second switch element and the third switch element being electrically connected to the first sub electrode, the second sub electrode and the third sub electrode, respectively; input terminals of the first switch element, the second switch element and the third switch element being electrically connected to the one of the plurality of data lines individually; control terminals of the first switch element and the second switch element being electrically connected to the one of the plurality of first scan lines individually, and control terminal of the third switch element being electrically connected to the one of the plurality of second scan lines;

wherein the one of the plurality of second scan lines inputting scan signal to control the third switch element to conduct when entering 3D display mode, the one of the plurality of data lines inputting a voltage signal corresponding to BM (black matrix) image through the third switch element to the third sub electrode, and then stopping inputting scan signal to the one of the plurality of second scan lines; after stopping inputting scan signal to the one of the plurality of second scan lines, the one of the plurality of first scan lines inputting scan signal to control the first switch element and the second switch element to conduct, the one of the plurality of data lines inputting voltage signal corresponding to a same image to be displayed through the first switch element and the second switch element respectively to the first sub electrode and the second sub electrode, and controlling a default voltage difference existing between the first sub electrode and the second sub electrode.

15. The liquid crystal display panel as claimed in claim 14, characterized in that:

the liquid crystal display panel is a VA (vertical alignment) liquid crystal display panel;

when entering 2D display mode, the one of the plurality of first scan lines and the one of the plurality of second scan lines input scan signal respectively to control the first switch element, the second switch element and the third switch element to conduct, and the one of the plurality of data lines inputs a voltage signal corresponding to a same image to be displayed through the first switch element, the second switch element and the third switch element respectively to the first sub electrode, the second sub electrode and the third sub electrode, and controlling a default voltage difference to exist between at least two sub electrodes selected from the first sub electrode, the second sub electrode and the third sub electrode.

* * * * *